United States Patent [19]

Emert et al.

[11] Patent Number: 5,273,668
[45] Date of Patent: Dec. 28, 1993

[54] OIL SOLUBLE DISPERSANT ADDITIVES MODIFIED WITH BIS-KETO/THIOKETO COMPOUNDS

[75] Inventors: Jacob Emert, Brooklyn, N.Y.; Antonio Gutierrez, Mercerville; Robert D. Lundberg, Bridgewater, both of N.J.

[73] Assignee: Exxon Chemical Patents Inc., Linden, N.J.

[21] Appl. No.: 8,863

[22] Filed: Jan. 25, 1993

Related U.S. Application Data

[60] Continuation of Ser. No. 930,143, Aug. 13, 1992, abandoned, which is a division of Ser. No. 303,683, Jan. 30, 1989, Pat. No. 5,158,696.

[51] Int. Cl.$^5$ .................. C10M 135/14; C10M 133/56
[52] U.S. Cl. .................. 252/46.3; 252/49.6; 548/520; 548/546; 548/547; 558/251; 558/253; 558/256; 564/8
[58] Field of Search ............ 252/46.3, 49.6; 548/520, 546, 547; 558/251, 253, 256; 564/8

[56] References Cited

U.S. PATENT DOCUMENTS

| | | | |
|---|---|---|---|
| 3,280,034 | 10/1966 | Anzenberger | 44/344 |
| 3,390,086 | 6/1968 | O'Halloran | 252/47.5 |
| 3,455,831 | 7/1969 | Davis | 44/347 |
| 3,455,832 | 7/1969 | Davis | 44/347 |
| 3,546,243 | 12/1970 | Coupland | 252/51.5 A |
| 3,694,374 | 9/1972 | Sparks et al. | 252/46.3 |
| 3,927,041 | 12/1975 | Cengel et al. | 44/351 |
| 4,062,786 | 12/1977 | Brois et al. | 252/51.5 R |
| 4,113,639 | 9/1978 | Lonstrup et al. | 252/51.5 A |
| 4,123,373 | 10/1978 | Brois et al. | 252/48.6 |
| 4,234,435 | 11/1980 | Meinhardt et al. | 252/46.7 |
| 4,394,278 | 7/1983 | Horodysky et al. | 252/46.3 |
| 4,548,724 | 9/1985 | Karol et al. | 252/51.5 A |
| 4,579,675 | 4/1986 | Sawicki et al. | 252/51.5 A |
| 4,636,322 | 1/1987 | Nalesnik | 252/51.5 A |
| 4,680,129 | 7/1987 | Plavac | 252/51.5 A |
| 4,695,391 | 9/1987 | Buckley | 252/51.5 A |
| 4,701,274 | 10/1987 | Croudace | 252/46.3 |
| 4,906,393 | 3/1990 | Farng et al. | 252/46.3 |
| 4,943,382 | 7/1990 | Gutierrez et al. | 252/51.5 A |
| 5,085,788 | 2/1992 | Emert et al. | 548/520 |
| 5,158,696 | 10/1992 | Emert et al. | 252/47.5 |

FOREIGN PATENT DOCUMENTS 1162436 8/1969 United Kingdom .......... 252/51.5 A Primary Examiner—Ellen M. McAvoy
Attorney, Agent, or Firm—J. B. Murray, Jr.; T. V. Kowalchyn

[57] ABSTRACT

The present invention is directed to an oil-soluble lubricating oil additive comprising at least one adduct of (A) a polyolefin of 700 to 5,000 number average molecular weight substituted nitrogen- or ester-containing ashless dispersant and (B) a bis-keto/thioketo compound.

44 Claims, No Drawings

OIL SOLUBLE DISPERSANT ADDITIVES MODIFIED WITH BIS-KETO/THIOKETO COMPOUNDS

This is a continuation, of application Ser. No. 930,143, filed Aug. 13, 1992, now abandoned, which is a division of U.S. Ser. No. 303,683, filed Jan. 30, 1989, now U.S. Pat. No. 5,158,696.

FIELD OF THE INVENTION

This invention relates to oil soluble dispersant additives useful in fuel and lubricating oil compositions including concentrates containing said additives, and methods for their manufacture and use. The dispersant additives of the instant invention are comprised of the reaction products of (1) nitrogen or ester containing ashless dispersants and (2) linking reactants comprising bis-keto/thioketo compounds.

BACKGROUND OF THE INVENTION

Multigrade lubricating oils typically are identified by two numbers such as 10W30, 5W30 etc. The first number in the multigrade designation is associated with a maximum low temperature (e.g. −20° C.) viscosity requirement for that multigrade oil as measured typically by a cold cranking simulator (CCS) under high shear, while the second number in the multigrade designation is associated with a minimum high temperature (e.g. 100° C.) viscosity requirement. Thus, each particular multigrade oil must simultaneously meet both strict low and high temperature viscosity requirements in order to qualify for a given multigrade oil designation. Such requirements are set e.g., by ASTM specifications. By "low temperature" as used herein is meant temperatures of typically from about −30° to about −5° C. By "high temperature" as used herein is meant temperatures of typically at least about 100° C.

The minimum high temperature viscosity requirement, e.g. at 100° C., is intended to prevent the oil from thinning out too much during engine operation which can lead to excessive wear and increased oil consumption. The maximum low temperature viscosity requirement is intended to facilitate engine starting in cold weather and to ensure pumpability, i.e., the cold oil should readily flow or slump into the well for the oil pump, otherwise the engine can be damaged due to insufficient lubrication.

In formulating an oil which efficiently meets both low and high temperature viscosity requirements, the formulator may use a single oil of desired viscosity or a blend of two lubricating oils of different viscosities, in conjunction with manipulating the identity and amount of additives that must be present to achieve the overall target properties of a particular multigrade oil including its viscosity requirements.

The natural viscosity characteristic of a lubricating oil is typically expressed by the neutral number of the oil (e.g. S150N) with a higher neutral number being associated with a higher natural viscosity at a given temperature. In some instances the formulator will find it desirable to blend oils of two different neutral numbers, and hence viscosities, to achieve an oil having a viscosity intermediate between the viscosity of the components of the oil blend. Thus, the neutral number designation provides the formulator with a simple way to achieve a desired base oil of predictable viscosity. Unfortunately, merely blending oils of different viscosity characteristics does not enable the formulator to meet the low and high temperature viscosity requirements of multigrade oils. The formulator's primary tool for achieving this goal is an additive conventionally referred to as a viscosity index improver (i.e., V.I. improver).

The V.I. improver is conventionally an oil-soluble long chain polymer. The large size of these polymers enables them to significantly increase kinematic viscosities of base oils even at low concentrations. However, because solutions of high polymers are non-Newtonian they tend to give lower viscosities than expected in a high shear environment due to the alignment of the polymer. Consequently, V.I. improvers impact (i.e., increase) the low temperature (high shear) viscosities (i.e. CCS viscosity) of the base oil to a lesser extent than they do the high temperature (low shear) viscosities.

The aforesaid viscosity requirements for a multigrade oil can therefore be viewed as being increasingly antagonistic at increasingly higher levels of V.I. improver. For example, if a large quantity of V.I. improver is used in order to obtain high viscosity at high temperatures, the oil may now exceed the low temperature requirement. In another example, the formulator may be able to readily meet the requirement for a 10W30 oil but not a 5W30 oil, with a particular ad-pack (additive package) and base oil. Under these circumstances the formulator may attempt to lower the viscosity of the base oil, such as by increasing the proportion of low viscosity oil in a blend, to compensate for the low temperature viscosity increase induced by the V.I. improver, in order to meet the desired low and high temperature viscosity requirements. However, increasing the proportion of low viscosity oils in a blend can in turn lead to a new set of limitations on the formulator, as lower viscosity base oils are considerably less desirable in diesel engine use than the heavier, more viscous oils.

Further complicating the formulator's task is the effect that dispersant additives can have on the viscosity characteristics of multigrade oils. Dispersants are frequently present in quality oils such as multigrade oils, together with the V.I. improver. The primary function of a dispersant is to maintain oil insolubles, resulting from oxidation during use, in suspension in the oil thus preventing sludge flocculation and precipitation. Consequently, the amount of dispersant employed is dictated and controlled by the effectiveness of the material for achieving its dispersant function. A high quality 10W30 commercial oil might contain from two to four times as much dispersant as V.I. improver (as measured by the respective dispersant and V.I. improver active ingredients). In addition to dispersancy, conventional dispersants can also increase the low and high temperature viscosity characteristics of a base oil simply by virtue of their polymeric nature. In contrast to the V.I. improver, the dispersant molecule is much smaller. Consequently, the dispersant is much less shear sensitive, thereby contributing more to the low temperature CCS viscosity (relative to its contribution to the high temperature viscosity of the base oil) than a V.I. improver. Moreover, the smaller dispersant molecule contributes much less to the high temperature viscosity of the base oil than the V.I. improver. Thus, the magnitude of the low temperature viscosity increase induced by the dispersant can exceed the low temperature viscosity increase induced by the V.I. improver without the benefit of a proportionately greater increase in high temperature viscosity as obtained from a V.I. improver.

Consequently, as the dispersant induced low temperature viscosity increase causes the low temperature viscosity of the oil to approach the maximum low temperature viscosity limit, the more difficult it is to introduce a sufficient amount of V.I. improver effective to meet the high temperature viscosity requirement and still meet the low temperature viscosity requirement. The formulator is thereby once again forced to shift to the undesirable expedient of using higher proportions of low viscosity oil to permit addition of the requisite amount of V.I. improver without exceeding the low temperature viscosity limit.

In accordance with the present invention, dispersants are provided which have been found to possess inherent characteristics such that they contribute considerably less to low temperature viscosity increases than dispersants of the prior art while achieving similar high temperature viscosity increases. Moreover, as the concentration of dispersant in the base oil is increased, this beneficial low temperature viscosity effect becomes increasingly more pronounced relative to conventional dispersants. This advantage is especially significant for high quality heavy duty diesel oils which typically require high concentrations of dispersant additive. Furthermore, these improved viscosity properties facilitate the use of V.I. improvers in forming multigrade oils spanning a wider viscosity requirement range, such as 5W30 oils, due to the overall effect of lower viscosity increase at low temperatures while maintaining the desired viscosity at high temperatures as compared to the other dispersants. More significantly, these viscometric properties also permit the use of higher viscosity base stocks with attendant advantages in engine performance. Furthermore, the utilization of the dispersant additives of the instant invention allows a reduction in the amount of V.I. improvers required.

The materials of this invention are thus an improvement over conventional dispersants because of their effectiveness as dispersants coupled with enhanced low temperature viscometric properties. These materials are particularly useful with V.I. improvers in formulating multigrade oils.

SUMMARY OF THE INVENTION

In accordance with the preferred embodiment, the present invention is directed to improve oil soluble dispersants comprising nitrogen or ester, preferably nitrogen, containing dispersants adducts which are post-reacted with at least one linking reactant comprising a bis-keto/thioketo ester/thioester compound. The nitrogen or ester containing adducts or intermediates which are reacted with the bis-keto/thioketo ester/thioester compound to form the improved dispersants of this invention will comprise at least one member selected from the group consisting of (A-1) oil soluble salts, amides, imides, oxazolines and esters, or mixtures thereof, of long chain hydrocarbon substituted mono- and dicarboxylic acids or their anhydrides or esters; (A-2) long chain aliphatic hydrocarbon having a polyamine attached directly thereto; (A-3) Mannich condensation products formed by condensing about a molar proportion of long chain hydrocarbon substituted phenol with about 1 to 2.5 moles of formaldehyde and about 0.5 to 2 moles of polyamine; and (A-4) Mannich condensation products formed by reacting long chain hydrocarbon substituted mono- and dicarboxylic acids or their anhydrides or esters with an aminophenol, which may be optionally hydrocarbyl substituted, to form a long chain hydrocarbon substituted amide or imide-containing phenol intermediate adduct, and condensing about a molar proportion of the long chain hydrocarbon substituted amide- or imide-containing phenol intermediate adduct with about 1 to 2.5 moles of formaldehyde and about 0.5 to 2 moles of polyamine.

DETAILED DESCRIPTION OF THE INVENTION

In accordance with the present invention there are provided oil soluble dispersant compositions. These dispersants exhibit a high temperature to low temperature viscosity balance or ratio which is more favorable than that of conventional dispersant materials. That is to say, the instant dispersant materials possess inherent characteristics such that they contribute less to low temperature viscosity increase than dispersants of the prior art while increasing the contribution to the high temperature viscosity increase. They also exhibit enhanced or improved dispersancy characteristics. In the preferred embodiment, this is believed to be due, inter alia, (1) to the presence of amide or thioamide groups each positioned beta to a carbonyl or thiocarbonyl group, formed as a result of the reaction of the "terminal" carbonyl or thiocarbonyl groups in bis-beta-keto/-thioketo compound with the reactive amino groups of the nitrogen containing adducts as described hereinafter, or (2) to the presence of ester or thioester groups each positioned beta to a carbonyl or thiocarbonyl group, formed as a result of the reaction of the "terminal" carbonyl or thiocarbonyl groups in the bis-beta-keto/thioketo compound with the reactive ester groups of the ester containing adducts as described hereinafter.

In accordance with one embodiment of the present invention, the improved dispersants are comprised of the oil soluble reaction products of:

(A) nitrogen or ester containing adducts selected from the group consisting of (A-1) oil soluble salts, amides, imides, oxazolines and esters, or mixtures thereof, of long chain hydrocarbon substituted mono- and dicarboxylic acids or their anhydrides or esters; (A-2) long chain aliphatic hydrocarbon having a polyamine attached directly thereto; (A-3) Mannich condensation products formed by condensing a long chain hydrocarbon substituted phenol with an aldehyde and a polyamine; and (A-4) Mannich condensation products formed by reacting long chain hydrocarbon substituted mono- and dicarboxylic acids or their anhydrides or esters with an aminophenol, which may be optionally hydrocarbyl substituted, to form a long chain hydrocarbon substituted amide or imide-containing phenol intermediate adduct, and condensing about a molar proportion of the long chain hydrocarbon substituted amide- or imide-containing phenol intermediate adduct with about 1 to 2.5 moles of formaldehyde and about 0.5 to 2 moles of polyamine, wherein said long chain hydrocarbon group in (A-1), (A-2), (A-3) and (A-4) is a polymer of a $C^2$ to $C_{10}$, e.g., $C^2$ to $C^5$ monoolefin, said polymer having a number average molecular weight of about 500 to about 6,000; and (B) at least one bis-keto/thioketo ester/thioester compound.

The molecular weight of the product is increased by the coupling or linking of two or more molecules of the adduct by or through the bis-keto/thioketo linking reactant moieties.

Reactant A

The long chain hydrocarbyl polymer-substituted mono- or dicarboxylic acid material, i.e., acid, anhydride or acid ester used in preparing Reactant A-1 of this invention, includes the reaction product of a long chain hydrocarbon polymer, generally a polyolefin, with a monounsaturated carboxylic reactant comprising at least one member selected from the group consisting of (i) monounsaturated $C_4$ to $C_{10}$ dicarboxylic acid (preferably wherein (a) the carboxyl groups are vicinyl, (i.e. located on adjacent carbon atoms) and (b) at least one, preferably both, of said adjacent carbon atoms are part of said mono unsaturation); (ii) derivatives of (i) such as anhydrides or $C_1$ to $C_5$ alcohol derived mono- or di-esters of (i); (iii) monounsaturated $C_3$ to $C_{10}$ monocarboxylic acid wherein the carbon-carbon double bond is conjugated to the carboxy group, i.e, of the structure

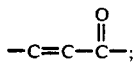

and (iv) derivatives of (iii) such as $C_1$ to $C_5$ alcohol derived monoesters of (iii). Upon reaction with the polymer, the monounsaturation of the monounsaturated carboxylic reactant becomes saturated. Thus, for example, maleic anhydride becomes a polymer substituted succinic anhydride, and acrylic acid becomes a polymer substituted propionic acid.

Typically, from about 0.7 to about 4.0 (e.g., 0.8 to 2.6), preferably from about 1.0 to about 2.0, and most preferably from about 1.1 to about 1.7 moles of said monounsaturated carboxylic reactant are charged to the reactor per mole of polymer charged.

Normally, not all of the polymer reacts with the monounsaturated carboxylic reactant and the reaction mixture will contain non-acid substituted polymer. The polymer-substituted mono- or dicarboxylic acid material (also referred to herein as "functionalized" polymer or polyolefin), non-acid substituted polyolefin, and any other polymeric by-products, e.g. chlorinated polyolefin, (also referred to herein as "unfunctionalized" polymer) are collectively referred to herein as "product residue" or "product mixture". The non-acid substituted polymer is typically not removed from the reaction mixture (because such removal is difficult and would be commercially infeasible) and the product mixture, stripped of any monounsaturated carboxylic reactant is employed for further reaction with the amine or alcohol as described hereinafter to make the dispersant.

Characterization of the average number of moles of monounsaturated carboxylic reactant which have reacted per mole of polymer charged to the reaction (whether it has undergone reaction or not) is defined herein as functionality. Said functionality is based upon (i) determination of the saponification number of the resulting product mixture using potassium hydroxide; and (ii) the number average molecular weight of the polymer charged, using techniques well known in the art. Functionality is defined solely with reference to the resulting product mixture. Although the amount of said reacted polymer contained in the resulting product mixture can be subsequently modified, i.e. increased or decreased by techniques known in the art, such modifications do not alter functionality as defined above. The terms "polymer substituted monocarboxylic acid material" and "polymer substituted dicarboxylic acid material" as used herein are intended to refer to the product mixture whether it has undergone such modification or not.

Accordingly, the functionality of the polymer substituted mono- and dicarboxylic acid material will be typically at least about 0.5, preferably at least about 0.8, and most preferably at least about 0.9 and will vary typically from about 0.5 to about 2.8 (e.g., 0.6 to 2), preferably from about 0.8 to about 1.4, and most preferably from about 0.9 to about 1.3.

Exemplary of such monounsaturated carboxylic reactants are fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing, e.g., methyl maleate, ethyl fumarate, methyl fumarate, etc.

Preferred olefin polymers for reaction with the monounsaturated carboxylic reactants A are polymers comprising a major molar amount of $C_2$ to $C_{10}$, e.g. $C_2$ to $C_5$ monoolefin. Such olefins include ethylene, propylene, butylene, isobutylene, pentene, octene-1, styrene, etc. The polymers can be homopolymers such as polyisobutylene, as well as copolymers of two or more of such olefins such as copolymers of: ethylene and propylene; butylene and isobutylene; propylene and isobutylene; etc. Mixtures of polymers prepared by polymerization of mixtures of isobutylene, butene-1 and butene-2, e.g., polyisobutylene wherein up to about 40% of the monomer units are derived from butene-1 and butene-2, is an exemplary, and preferred, olefin polymer. Other copolymers include those in which a minor molar amount of the copolymer monomers, e.g., 1 to 10 mole %, is a $C_4$ to $C_{18}$ non-conjugated diolefin, e.g., a copolymer of isobutylene and butadiene; or a copolymer of ethylene, propylene and 1,4-hexadiene; etc.

In some cases, the olefin polymer may be completely saturated, for example an ethylene-propylene copolymer made by a Ziegler-Natta synthesis using hydrogen as a moderator to control molecular weight.

The olefin polymers used in the formation of reactant A will generally have number average molecular weights within the range of about 700 and about 5,000, preferably from about 900 to 4,000, more preferably between about 1,300 and about 3,000. Particularly useful olefin polymers have number average molecular weights within the range of about 1,500 and about 3,000 with approximately one terminal double bond per polymer chain. An especially useful starting material for highly potent dispersant additives useful in accordance with this invention is polyisobutylene, wherein up to about 40% of the monomer units are derived from butene-1 and/or butene-2. The number average molecular weight for such polymers can be determined by several known techniques. A convenient method for such determination is by gel permeation chromatography (GPC) which additionally provides molecular weight distribution information, see W. W. Yau, J. J. Kirkland and D. D. Bly, "Modern Size Exclusion Liquid Chromatography", John Wiley and Sons, New York, 1979.

The olefin polymers will generally have a molecular weight distribution (the ratio of the weight average molecular weight to number average molecular weight, i.e. $\overline{M}_w/\overline{M}_n$) of from about 1.0 to 4.5, and more typically from about 1.5 to 3.0.

The polymer can be reacted with the monounsaturated carboxylic reactant by a variety of methods. For example, the polymer can be first halogenated, chlorinated or brominated to about 1 to 8 wt. %, preferably 3 to 7 wt. % chlorine, or bromine, based on the weight of polymer, by passing the chlorine or bromine through the polymer at a temperature of 60° to 250° C., preferably 110° to 160° C., e.g. 120° to 140° C., for about 0.5 to 10, preferably 1 to 7 hours. The halogenated polymer may then be reacted with sufficient monounsaturated carboxylic reactant at 100° to 250° C., usually about 180° to 235° C., for about 0.5 to 10, e.g. 3 to 8 hours, so the product obtained will contain the desired number of moles of the monounsaturated carboxylic reactant per mole of the halogenated polymer. Processes of this general type are taught in U.S. Pat. Nos. 3,087,436; 3,172,892; 3,272,746 and others. Alternatively, the polymer and the monounsaturated carboxylic reactant are mixed and heated while adding chlorine to the hot material. Processes of this type are disclosed in U.S. Pat. Nos. 3,215,707; 3,231,587; 3,912,764; 4,110,349; 4,234,435; and in U.K. 1,440,219.

Alternately, the polymer and the monounsaturated carboxylic reactant can be contacted at elevated temperature to cause a thermal "ene" reaction to take place. Thermal "ene" reactions have been heretofore described in U.S. Pat. Nos. 3,361,673 and 3,401,118, the disclosures of which are hereby incorporated by reference in their entirety.

Preferably, the polymers used in this invention contain less than 5 wt%, more preferably less than 2 wt%, and most preferably less than 1 wt% of a polymer fraction comprising polymer molecules having a molecular weight of less than about 300, as determined by high temperature gel permeation chromatography employing the corresponding polymer calibration curve. Such preferred polymers have been found to permit the preparation of reaction products, particularly when employing maleic anhydride as the unsaturated acid reactant, with decreased sediment. In the event the polymer produced as described above contains greater than about 5 wt% of such a low molecular weight polymer fraction, the polymer can be first treated by conventional means to remove the low molecular weight fraction to the desired level prior to initiating the ene reaction, and preferably prior to contacing the polymer with the selected unsaturated carboxylic reactant(s). For example, the polymer can be heated, preferably with inert gas (e.g., nitrogen) stripping, at elevated temperature under a reduced pressure to volatilize the low molecular weight polymer components which can then be removed from the heat treatment vessel. The precise temperature, pressure and time for such heat treatment can vary widely depending on such factors as the polymer number average molecular weight, the amount of the low molecular weight fraction to be removed, the particular monomers employed and other factors. Generally, a temperature of from about 60° to 100° C. and a pressure of from about 0.1 to 0.9 atmospheres and a time of from about 0.5 to 20 hours (e.g., 2 to 8 hours) will be sufficient.

In this process, the selected polymer and monounsaturated carboxylic reactant and halogen (e.g., chlorine gas), where employed, are contacted for a time and under conditions effective to form the desired polymer substituted mono- or dicarboxylic acid material. Generally, the polymer and monounsaturated carboxylic reactant will be contacted in a unsaturated carboxylic reactant to polymer mole ratio usually from about 0:7 to 4:1, and preferably from about 1:1 to 2:1, at an elevated temperature, generally from about 120 to 260° C., preferably from about 160° to 240° C. The mole ratio of halogen to monounsaturated carboxylic reactant charged will also vary and will generally range from about 0.5:1 to 4:1, and more typically from about 0.7:1 to 2:1 (e.g., from about 0.9 to 1.4:1). The reaction will be generally carried out, with stirring for a time of from about 1 to 20 hours, preferably from about 2 to 6 hours.

By the use of halogen, about 65 to 95 wt. % of the polyolefin, e.g. polyisobutylene will normally react with the monounsaturated carboxylic acid reactant. Upon carrying out a thermal reaction without the use of halogen or a catalyst, then usually only about 50 to 75 wt. % of the polyisobutylene will react. Chlorination helps increase the reactivity. For convenience, the aforesaid functionality ratios of mono- or dicarboxylic acid producing units to polyolefin, e.g., 1.1 to 1.8, etc. are based upon the total amount of polyolefin, that is, the total of both the reacted and unreacted polyolefin, used to make the product.

The reaction is preferably conducted in the substantial absence of $O_2$ and water (to avoid competing side reactions), and to this end can be conducted in an atmosphere of dry $N_2$ gas or other gas inert under the reaction conditions. The reactants can be charged separately or together as a mixture to the reaction zone, and the reaction can be carried out continuously, semi-continuously or batchwise. Although not generally necessary, the reaction can be carried out in the presence of a liquid diluent or solvent, e.g., a hydrocarbon diluent such as mineral lubricating oil, toluene, xylene, dichlorobenzene and the like. The polymer substituted mono- or dicarboxylic acid material thus formed can be recovered from the liquid reaction mixture, e.g., after stripping the reaction mixture, if desired, with an inert gas such as $N_2$ to remove unreacted unsaturated carboxylic reactant.

If desired, a catalyst or promoter for reaction of the olefin polymer and monounsaturated carboxylic reactant (whether the olefin polymer and monounsaturated carboxylic reactant are contacted in the presence or absence of halogen (e.g., chlorine)) can be employed in the reaction zone. Such catalysts or promoters include alkoxides of Ti, Zr, V and Al, and nickel salts (e.g., Ni acetoacetonate and Ni iodide) which catalysts or promoters will be generally employed in an amount of from about to 5,000 ppm by weight, based on the mass of the reaction medium.

Amine compounds useful as nucleophilic reactants for reaction with the hydrocarbyl substituted mono- and dicarboxylic acid materials are those containing at least two reactive amino groups, i.e., primary and secondary amino groups. They include polyalkylene include polyamines of about 2 to 60, preferably 2 to 40 (e.g. 3 to 20), total carbon atoms and about 1 to 20, preferably 3 to 12, and most preferably 3 to 9 nitrogen atoms in the molecule. These amines may be hydrocarbyl amines or may be hydrocarbyl amines including other groups, e.g, hydroxy groups, alkoxy groups, amide groups, nitriles, imidazoline groups, and the like. Hydroxy amines with 1 to 6 hydroxy groups, preferably 1 to 3 hydroxy groups are particularly useful. Preferred amines are aliphatic saturated amines, including those of the general formulas:

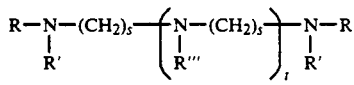

wherein R, R', R" and R'" are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy amino alkylene radicals; and $C_1$ to $C_{12}$ alkylamino $C_2$ to $C_6$ alkylene radicals; and wherein R'" can additionally comprise a moiety of the formula:

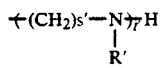

wherein R' is as defined above, and wherein s and s' can be the same or a different number of from 2 to 6, preferably 2 to 4; and t and t' can be the same or different and are numbers of from 0 to 10, preferably 2 to 7, and most preferably about 3 to 7, with the proviso that the sum of t and t' is not greater than 15. To assure a facile reaction, it is preferred that R, R', R", R'", s, s', t and t' be selected in a manner sufficient to provide the compounds of Formula I with typically at least one primary or secondary amine group, preferably at least two primary or secondary amine groups. This can be achieved by selecting at least one of said R, R', R" or R'" groups to be hydrogen or by letting t in Formula I be at least one when R'" is H or when the II moiety possesses a secondary amino group. The most preferred amine of the above formulas are represented by Formula I and contain at least two primary amine groups and at least one, and preferably at least three, secondary amine groups.

Non-limiting examples of suitable amine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di-(1,2-propylene)triamine; di-(1,3-propylene) triamine; N,N-dimethyl-1,3-diaminopropane; N,N-di-(2-aminoethyl) ethylene diamine; N,N-di(2-hydroxyethyl)-1,3-propylene diamine; 3-dodecyloxypropylamine; N-dodecyl-1,3-propane diamine; tris hydroxymethylam inomethane (THAM); diisopropanol amine: diethanol amine; triethanol amine; mono-, di-, and tri-tallow amines; amino morpholines such as N-(3-aminopropyl)morpholine; and mixtures thereof.

Other useful amine compounds include: alicyclic diamines such as 1,4-di(aminomethyl) cyclohexane, and heterocyclic nitrogen compounds such as imidazolines, and N-aminoalkyl piperazines of the general formula (III):

ing examples of such amines include 2-pentadecyl imidazoline; N-(2-aminoethyl) piperazine; etc.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pent amine and isom eric piperazines. Low cost poly(ethyleneamines) compounds averaging about 5 to 7 nitrogen atoms per molecule are available commercially under trade names such as "Polyamine H", "Polyamine 400", "Dow Polyamine E-100", etc.

Useful amines also include polyoxyalkylene polyamines such as those of the formulae:

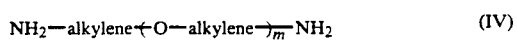

where m has a value of about 3 to 70 and preferably 10 to 35; and

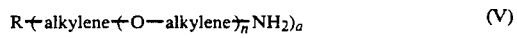

where "n" has a value of about 1 to 40 with the provision that the sum of all the n's is from about 3 to about 70 and preferably from about 6 to about 35, and R is a polyvalent saturated hydrocarbon radical of up to ten carbon atoms wherein the number of substituents on the R group is represented by the value of "a", which is a number of from 3 to 6. The alkylene groups in either formula (IV) or (V) may be straight or branched chains containing about 2 to 7, and preferably about 2 to 4 carbon atoms.

The polyoxyalkylene polyamines of formulas (IV) or (V) above, preferably polyoxyalkylene diamines and polyoxyalkylene triamines, may have average molecular weights ranging from about 200 to about 4000 and preferably from about 400 to about 2,000. The preferred polyoxyalkylene polyamines include the polyoxyethylene and polyoxypropylene diamines and the polyoxypropylene triamines having average molecular weights ranging from about 200 to 2,000. The polyoxyalkylene polyamines are commercially available and may be obtained, for example, from the Jefferson Chemical Company, Inc. under the trade name "Jeffamines D-230, D-400, D-1000, D-2000, T-403", etc.

Additional amines useful in the present invention are described in U.S. Pat. No. 3,445,441, the disclosure of which is hereby incorporated by reference in its entirety.

A particularly useful class of amines are the polyamido and related amines disclosed in co-pending Ser. No. 126,405, filed Nov. 30, 1987, which comprise

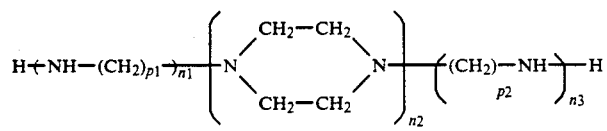

wherein $p_1$ and $p_2$ are the same or different and are each integers of from 1 to 4, and $n_1$, $n_2$ and $n_3$ are the same or different and are each integers of from 1 to 3. Non-limitreaction products of a polyamine and an alpha, beta unsaturated compound of the formula:

$$\begin{array}{c} \text{D}^6 \;\; \text{D}^7 \;\; \text{X} \\ | \;\;\; | \;\;\; \| \\ \text{D}^5-\text{C}=\text{C}-\text{C}-\text{Y} \end{array} \quad (\text{VI})$$

wherein X is sulfur or oxygen, Y is $-\text{OD}^8$, $-\text{SD}^8$, or $-\text{ND}^8(\text{D}^9)$, and $\text{D}^5$, $\text{D}^6$, $\text{D}^7$, $\text{D}^8$ and $\text{D}^9$ are the same or different and are hydrogen or substituted or unsubstituted hydrocarbyl. Any polyamine, whether aliphatic, cycloaliphatic, aromatic, heterocyclic, etc., can be employed provided it is capable of adding across the acrylic double bond and amidifying with for example the carbonyl group ($-\text{C(O)}-$) of the acrylate-type compound of formula VI, or with the thiocarbonyl group ($-\text{C(S)}-$) of the thioacrylate-type compound of formula VI.

When $\text{D}^5$, $\text{D}^6$, $\text{D}^7$, $\text{D}^8$ or $\text{D}^9$ in Formula VI are hydrocarbyl, these groups can comprise alkyl, cycloalkyl, aryl, alkaryl, aralkyl or heterocyclic, which can be substituted with groups which are substantially inert to any component of the reaction mixture under conditions selected for preparation of the amido-amine. Such substituent groups include hydroxy, halide (e.g., Cl, Fl, I, Br), $-\text{SH}$ and alkylthio. When one or more of $\text{D}^5$ through $\text{D}^9$ are alkyl, such alkyl groups can be straight or branched chain, and will generally contain from 1 to 20, more usually from 1 to 10, and preferably from 1 to 4, carbon atoms. Illustrative of such alkyl groups are methyl, ethyl, propyl, butyl, pentyl, hexyl, heptyl, octyl, nonyl, decyl, dodecyl, tridecyl, hexadecyl, octadecyl and the like. When one or more of $\text{D}^5$ through $\text{D}^9$ are aryl, the aryl group will generally contain from 6 to 10 carbon atoms (e.g., phenyl, naphthyl).

When one or more of $\text{D}^5$ through $\text{D}^9$ are alkaryl, the alkaryl group will generally contain from about 7 to 20 carbon atoms, and preferably from 7 to 12 carbon atoms. Illustrative of such alkaryl groups are tolyl, m-ethylphenyl, o-ethyltolyl, and m-hexyltolyl. When one or more of $\text{D}^5$ through $\text{D}^9$ are aralkyl, the aryl component generally consists of phenyl or ($\text{C}_1$ to $\text{C}_6$) alkyl-substituted phenol and the alkyl component generally contains from to 12 carbon atoms, and preferably from 1 to 6 carbon atoms. Examples of such aralkyl groups are benzyl, o-ethylbenzyl, and 4-isobutylbenzyl. When one or more of $\text{D}^5$ and $\text{D}^9$ are cycloalkyl, the cycloalkyl group will generally contain from 3 to 12 carbon atoms, and preferably from 3 to 6 carbon atoms. Illustrative of such cycloalkyl groups are cyclopropyl, cyclobutyl, cyclohexyl, cyclooctyl, and cyclododecyl. When one or more of $\text{D}^5$ through $\text{D}^9$ are heterocyclic, the heterocyclic group generally consists of a compound having at least one ring of 6 to 12 members in which one or more ring carbon atoms is replaced by oxygen or nitrogen. Examples of such heterocyclic groups are furyl, pyranyl, pyridyl, piperidyl, dioxanyl, tetrahydrofuryl, pyrazinyl and 1,4-oxazinyl.

The alpha, beta ethylenically unsaturated carboxylate compounds employed herein have the following formula:

$$\begin{array}{c} \text{D}^6 \;\; \text{D}^7 \;\; \text{O} \\ | \;\;\; | \;\;\; \| \\ \text{D}^5-\text{C}=\text{C}-\text{C}-\text{OD}^8 \end{array} \quad (\text{VII})$$

wherein $\text{D}^5$, $\text{D}^6$, $\text{D}^7$, and $\text{D}^8$ are the same or different and are hydrogen or substituted or unsubstituted hydrocarbyl as defined above. Examples of such alpha, beta-ethylenically unsaturated carboxylate compounds of formula VII are acrylic acid, methacrylic acid, the methyl, ethyl, isopropyl, n-butyl, and isobutyl esters of acrylic and methacrylic acids, 2-butenoic acid, 2-hexenoic acid, 2-decenoic acid, 3-methyl-2-heptenoic acid, 3-methyl-2-butenoic acid, 3-phenyl-2-propenoic acid, 3-cyclohexyl-2-butenoic acid, 2-methyl-2-butenoic acid, 2-propyl-2-propenoic acid, 2-isopropyl-2-hexenoic acid, 2,3-dimethyl-2-butenoic acid, 3-cyclohexyl-2-methyl-2-pentenoic acid, 2-propenoic acid, methyl 2-propenoate, methyl 2-methyl 2-propenoate, methyl 2-butenoate, ethyl 2-hexenoate, isopropyl 2-decenoate, phenyl 2-pentenoate, tertiary butyl 2-propenoate, octadecyl 2-propenoate, do decyl 2-decenoate, cyclopropyl 2,3-dimethyl-2-butenoate, methyl 3-phenyl-2-propenoate, and the like.

The alpha, beta ethylenically unsaturated carboxylate thioester compounds employed herein have the following formula:

$$\begin{array}{c} \text{D}^6 \;\; \text{D}^7 \;\; \text{O} \\ | \;\;\; | \;\;\; \| \\ \text{D}^5-\text{C}=\text{C}-\text{C}-\text{SD}^8 \end{array} \quad (\text{VIII})$$

wherein $\text{D}^5$, $\text{D}^6$, $\text{D}^7$, and $\text{D}^8$ are the same or different and are hydrogen or substituted or unsubstituted hydrocarbyl as defined above. Examples of such alpha, beta-ethylenically unsaturated carboxylate thioesters of formula VIII are methylmercapto 2-butenoate, ethylmercapto 2-hexenoate, isopropylmercapto 2-decenoate, phenylmercapto 2-pentenoate, tertiary butylmercapto 2-propenoate, octadecylmercapto 2-propenoate, dodecylmercapto 2-decenoate, cyclopropylmercapto 2,3-dimethyl-2-butenoate, methylmercapto 3-phenyl-2-propenoate, methylmercapto 2-propenoate, methylmercapto 2-methyl-2-propenoate, and the like.

The alpha, beta ethylenically unsaturated carboxyamide compounds employed herein have the following formula:

$$\begin{array}{c} \text{D}^6 \;\; \text{D}^7 \;\; \text{O} \\ | \;\;\; | \;\;\; \| \\ \text{D}^5-\text{C}=\text{C}-\text{C}-\text{ND}^8(\text{D}^9) \end{array} \quad (\text{IX})$$

wherein $\text{D}^5$, $\text{D}^6$, $\text{D}^7$, $\text{D}^8$ and $\text{D}^9$ are the same or different and are hydrogen or substituted or unsubstituted hydrocarbyl as defined above. Examples of alpha, beta-ethylenically unsaturated carboxyamides of formula IX are 2-butenamide, 2-hexenamide, 2 -decenamide, 3-methy 1- 2-heptenamide, 3-methyl-2-butenamide, 3-phenyl-2-propenamide, 3-cyclohexyl-2-butenamide, 2-methyl-2-butenamide, 2-propyl-2-propenamide, 2-isopropyl-2-hexenamide, 2,3-dimethyl-2-butenamide, 3-cyclohexyl-2-methyl-2-pentenamide, N-methyl 2-butenamide, N-methyl 2-butenamide, N,N-diethyl 2-hexenamide, N-isopropyl 2-decenamide, N-phenyl 2-pentenamide, N-tertiary butyl 2-propenamide, N-octadecyl 2-propenamide, N-N-didodecyl 2-decenamide, N-cyclopropyl 2,3-dimethyl-2-butenamide, N-methyl 3-phenyl-2-propenamide, 2-propenamide, 2-methyl-2-propenamide, 2-ethyl-2-propenamide and the like.

The alpha, beta ethylenically unsaturated thiocarboxylate compounds employed herein have the following formula:

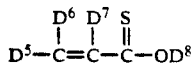

$$D^5-\underset{\underset{D^6}{|}}{C}=\underset{\underset{D^7}{|}}{C}-\overset{\overset{S}{\|}}{C}-OD^8 \quad (X)$$

wherein $D^5$, $D^6$, $D^7$ and $D^8$ are the same or different and are hydrogen or substituted or unsubstituted hydrocarbyl as defined above. Examples of alpha, beta-ethylenically unsaturated thiocarboxylate compounds of formula X are 2-butenthioic acid, 2-hexenthioic acid, 2-decenthioic acid, 3-methyl-2-heptenthioic acid, 3-methyl-2-butenthioic acid, 3-phenyl-2-propenthioic acid, 3-cyclohexyl-2-butenthioic acid, 2-methyl-2-butenthioic acid, 2-propyl-2-propenthioic acid, 2-isopropyl-2-hexenthioic acid, 2,3-dimethyl-2-butenthioic acid, 3-cyclohexyl-2-methyl-2-pententhioic acid, 2-propenthioic acid, methyl 2-propenthioate, methyl 2-methyl 2-propenthioate, methyl 2-butenthioate, ethyl 2-hexenthioate, isopropyl 2-decenthioate, phenyl 2-pententhioate, tertiary butyl 2-propenthioate, octadecyl 2-propenthioate, dodecyl 2-decenthioate, cyclopropyl 2,3-dimethyl-2-butenthioate, methyl 3-phenyl-2-propenthioate, and the like.

The alpha, beta ethylenically unsaturated dithioic acid and acid ester compounds employed herein have the following formula:

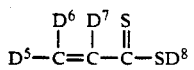

$$D^5-\underset{\underset{D^6}{|}}{C}=\underset{\underset{D^7}{|}}{C}-\overset{\overset{S}{\|}}{C}-SD^8 \quad (XI)$$

wherein $D^5$, $D^6$, $D^7$, and $D^8$ are the same or different and are hydrogen or substituted or unsubstituted hydrocarbyl as defined above. Examples of alpha, beta-ethylenically unsaturated dithioic acids and acid esters of formula XI are 2-butendithioic acid, 2-hexendithioic acid, 2-decendithioic acid, 3-methyl-2-heptendithioic acid, 3-methyl-2-butendithioic acid, 3-phenyl-2-propendithioic acid, 3-cyclohexyl-2-butendithioic acid, 2-methyl-2-butendithioic acid, 2-propyl-2-propendithioic acid, 2-isopropyl-2-hexendithioic acid, 2,3-dimethyl-2-butendithioic acid, 3-cyclohexyl-2-methyl-2-pentendithioic acid, 2-propendithioic acid, methyl 2-propendithioate, methyl 2-methyl 2-propendithioate, methyl 2-butendithioate, ethyl 2-hexendithioate, isopropyl 2-decendithioate, phenyl 2-pentendithioate, tertiary butyl 2-propendithioate, octadecyl 2-propendithioate, dodecyl 2-decendithioate, cyclopropyl 2,3-dimethyl-2-butendithioate, methyl 3-phenyl-2-propendithioate, and the like.

The alpha, beta ethylenically unsaturated thiocarboxyamide compounds employed herein have the following formula:

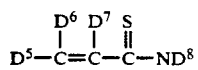

$$D^5-\underset{\underset{D^6}{|}}{C}=\underset{\underset{D^7}{|}}{C}-\overset{\overset{S}{\|}}{C}-ND^8 \quad (XII)$$

wherein $D^5$, $D^6$, $D^7$, $D^8$ and $D^9$ are the same or different and are hydrogen or substituted or unsubstituted hydrocarbyl as defined above. Examples of alpha, beta-ethylenically unsaturated thiocarboxyamides of formula XII are 2-butenthioamide, 2-hexenthioamide, 2-decenthioamide, 3-methyl-2-heptenthioamide, 3-methyl-2-butenthioamide, 3-phenyl-2-propenthioamide, 3-cyclohexyl-2-butenthioamide, 2-methyl-2-butenthioamide, 2-propyl-2-propenthioamide, 2-isopropyl-2-hexenthioamide, 2,3-dimethyl-2-butenthioamide, 3-cyclohexyl-2-methyl-2-pententhioamide, N-methyl 2-butenthioamide, N,N-diethyl 2-hexenthioamide, N-isopropyl 2-decenthioamide, N-phenyl 2-pententhioamide, N-tertiary butyl 2-propenthioamide, N-octadecyl 2-propenthioamide, N-N -didodecyl 2-decenthioamide, N-cyclopropyl 2,3-dimethyl-2-butenthioamide, N-methyl 3-phenyl-2- propenthioamide, 2-propenthioamide, 2-methyl-2-propenthioamide, 2-ethyl-2-propenthioamide and the like.

Preferred compounds for reaction with the polyamines in accordance with this invention are lower alkyl esters of acrylic and (lower alkyl) substituted acrylic acid. Illustrative of such preferred compounds are compounds of the formula:

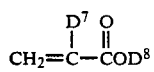

$$CH_2=\underset{\underset{D^7}{|}}{C}-\overset{\overset{O}{\|}}{C}-OD^8 \quad (XIII)$$

where $D^7$ is hydrogen or a $C_1$ to $C_4$ alkyl group, such as methyl, and $D^8$ is hydrogen or a $C_1$ to $C_4$ alkyl group, capable of being removed so as to form an amido group, for example, methyl, ethyl, propyl, isopropyl, butyl, sec-butyl, tert-butyl, aryl, hexyl, etc. In the preferred embodiments these compounds are acrylic and methacrylic esters such as methyl or ethyl acrylate, methyl or ethyl methacrylate. When the selected alpha, beta-unsaturated compound comprises a compound of formula XIII wherein X' is oxygen, the resulting reaction product with the polyamine contains at least one amido linkage (—C(O)N<) and such materials are herein termed "amido-amines." Similarly, when the selected alpha, beta unsaturated compound of formula XIII comprises a compound wherein X' is sulfur, the resulting reaction product with the polyamine contains thioamide linkage (—C(S)N<) and these materials are herein termed "thioamido-amines." For convenience, the following discussion is directed to the preparation and use of amido-amines, although it will be understood that such discussion is also applicable to the thioamido-amines.

The type of amido-amine formed varies with reaction conditions. For example, a more linear amido-amine is formed where substantially equimolar amounts of the unsaturated carboxylate and polyamine are reacted. The presence of excesses of the ethylenically unsaturated reactant of formula XIII tends to yield an amido-amine which is more cross-linked than that obtained where substantially equimolar amounts of reactants are employed. Where for economic or other reasons a cross-linked amido-amine using excess amine is desired, generally a molar excess of the ethylenically unsaturated reactant of about at least 10%, such as 10–300%, or greater, for example, 25–200%, is employed. For more efficient cross-linking an excess of carboxylated material should preferably be used since a cleaner reaction ensues. For example, a molar excess of about 10–100% or greater such as 10–50%, but preferably an excess of 30–50%, of the carboxylated material. Larger excess can be employed if desired.

In summary, without considering other factors, equimolar amounts of reactants tend to produce a more linear amido-amine whereas excess of the formula VI reactant tends to yield a more cross-linked amido-amine. It should be noted that the higher the polyamine (i.e., in greater the number of amino groups on the molecule) the greater the statistical probability of cross-linking since, for example, a tetraalkylenepentamine, such as tetraethylene pentamine

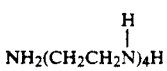

has more labile hydrogens than ethylene diamine.

These amido-amine adducts so formed are characterized by both amido and amino groups, as represented, for example, by the following formula:

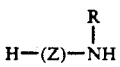

wherein Z is a unit represented by the following idealized formula (XIV):

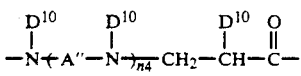

wherein the $D^{10}$'s, which may be the same or different, are hydrogen or a substituted group, such as a hydrocarbon group, for example, alkyl, alkenyl, alkynyl, aryl, etc., and A" is a moiety of the polyamine which, for example, may be aryl, cycloalkyl, alkyl, etc., and $n_4$ is an integer such as 1–10 or greater.

The above simplified formula represents a linear amido-amine polymer. However, cross-linked polymers may also be formed by employing certain conditions since the polymer has labile hydrogens which can further react with either the unsaturated moiety by adding across the double bond or by amidifying with a carboxylate group.

Preferably, however, the amido-amines employed in this invention are not cross-linked to any substantial degree, and more preferably are substantially linear.

Preferably, the polyamine reactant contains at least one primary amine (and more preferably from 2 to 4 primary amines) group per molecule, and the polyamine and the unsaturated reactant of formula XIII are contacted in an amount of from about 1 to 10, more preferably from about 2 to 6, and most preferably from about 3 to 5, equivalents of primary amine in the polyamine reactant per mole of the unsaturated reactant of formula XIII.

The reaction between the selected polyamine and acrylate-type compound is carried out at any suitable temperature. Temperatures up to the decomposition points of reactants and products can be employed. In practice, one generally carries out the reaction by heating the reactants below 100° C., such as 80°–90° C., for a suitable period of time, such as a few hours. Where an acrylic-type ester is employed, the progress of the reaction can be judged by the removal of the alcohol in forming the amide.

During the early part of the reaction alcohol is removed quite readily below 100° C. in the case of low boiling alcohols such as methanol or ethanol. As the reaction slows, the temperature is raised to push the polymerization to completion and the temperature may be raised to 150° C. toward the end of the reaction. Removal of alcohol is a convenient method of judging the progress and completion of the reaction which is generally continued until no more alcohol is evolved. Based on removal of alcohol, the yields are generally stoichiometric. In more difficult reactions, yields of at least 95% are generally obtained.

Similarly, it will be understood that the reaction of an ethylenically unsaturated carboxylate thioester of formula VI liberates the corresponding $HSD^8$ compound (e.g., $H_2S$ when $D^8$ is hydrogen) as a by-product, and the reaction of an ethylenically unsaturated carboxyamide of formula V liberates the corresponding $HND^8(D^9)$ compound (e.g., ammonia when $D^8$ and $D^9$ are each hydrogen) as by-product.

The amine is readily reacted with the dicarboxylic acid material, e.g. alkenyl succinic anhydride, by heating an oil solution containing 5 to 95 wt. % of dicarboxylic acid material to about 100° to 200° C., preferably 125° to 175° C., generally for 1 to 10, e.g. 2 to 6 hours until the desired amount of water is removed. The heating is preferably carried out to favor formation of imides or mixtures of imides and amides, rather than amides and salts. Reaction ratios of dicarboxylic acid material to equivalents of amine as well as the other nucleophilic reactants described herein can vary considerably, depending upon the reactants and type of bonds formed. Generally from 0.1 to 1.0, preferably about 0.2 to 0.6, e.g. 0.4 to 0.6, moles of dicarboxylic acid moiety content (e.g. grafted maleic anhydride content) is used, per equivalent of nucleophilic reactant, e.g. amine. For example, about 0.8 mole of a pentamine (having two primary amino groups and 5 equivalents of nitrogen per molecule) is preferably used to convert into a mixture of amides and imides, the product formed by reacting one mole of olefin with sufficient maleic anhydride to add 1.6 moles of succinic anhydride groups per mole of olefin, i.e. preferably the pentamine is used in an amount sufficient to provide about 0.4 mole (that is 1.6/[0.8×5] mole) of succinic anhydride moiety per nitrogen equivalent of the amine.

Tris(hydroxymethyl) amino methane (THAM) can be reacted with the aforesaid acid material to form amides, imides or ester type additives as taught by U.K. 984,409, or to form oxazoline compounds and borated oxazoline compounds as described, for example, in U.S. Pat. No. 4,102,798; 4,116,876 and 4,113,639.

The adducts may also be esters derived from the aforesaid long chain hydrocarbon substituted dicarboxylic acid material and from hydroxy compounds such as monohydric and polyhydric alcohols or aromatic compounds such as phenols and naphthols, etc. The polyhydric alcohols are the most preferred hydroxy compounds. Suitable polyol compounds which can be used include aliphatic polyhydric alcohols containing up to about 100 carbon atoms and about 2 to about 10 hydroxyl groups. These alcohols can be quite diverse in structure and chemical composition, for example, they can be substituted or unsubstitued, hindered or unhindered, branched chain or straight chain, etc. as desired. Typical alcohols are alkylene glycols such as ethylene glycol, propylene glycol, trimethylene glycol, butylene glycol, and polyglycol such as diethylene glycol, triethylene glycol, tetraethylene glycol, dipropylene glycol, tripropylene glycol, dibutylene glycol, tributylene glycol, and other alkylene glycols and polyalkylene glycols in which the alkylene radical contains from two to about eight carbon atoms. Other useful polyhydric alcohols include glycerol monomethyl ether of glycerol, pentaerythritol, dipentaerythritol, tripentaerythritol, 9,10-dihydroxystearic acid, the ethyl ester of 9,10-dihydroxystearic acid, 3-chloro-1, 2-propanediol, 1,2-butanediol, 1,4-butanediol, 2,3-hexanediol, pinacol, tetrahydroxy pentane, erythritol, arabitol, sorbitol, mannitol, 1,2-cyclohexanediol, 1,4-cyclohexanediol, 1,4-(2-hydroxyethyl)-cyclohexane, 1,4-dihydroxy-2-nitrobutane, 1,4-di-(2-hydroxyethyl)-benzene, the carbohydrates such as glucose, rhamnose, mannose, glyceraldehyde, and galactose, and the like, amino alcohols such as di-(2-hydroxyethyl) amine, tri-(3 hydroxypropyl) amine, N,N,-di-(hydroxyethyl) ethylenediamine, copolymer of allyl alcohol and styrene, N,N-di-(2-hydroxylethyl) glycine and esters thereof with lower mono- and polyhydric aliphatic alcohols etc.

Included within the group of aliphatic alcohols are those alkane polyols which contain ether groups such as polyethylene oxide repeating units, as well as those polyhydric alcohols containing at least three hydroxyl groups, at least one of which has been esterified with a mono-carboxylic acid having from eight to about 30 carbon atoms such as octanoic acid, oleic acid, stearic acid, linoleic acid, dodecanoic acid, or tall oil acid. Examples of such partially esterified polyhydric alcohols are the mono-oleate of sorbitol, the mono-oleate of glycerol, the mono-stearate of glycerol, the di-stearate of sorbitol, and the di-dodecanoate of erythritol.

A preferred class of ester containing adducts are those prepared from aliphatic alcohols containing up to 20 carbon atoms, and especially those containing three to 15 carbon atoms. This class of alcohols includes glycerol, erythritol, pentaerythritol, dipentaerythritol, tripentaerythritol, gluconic acid, glyceraldehyde, glucose, arabinose, 1,7-heptanediol, 2,4-heptanediol, 1,2,3-hexanetriol, 1,2,4-hexanetriol, 1,2,5-hexanetriol, 2,3,4-hexanetriol, 1,2,3-butanetriol, 1,2,4-butanetriol, quinic acid, 2,2,6,6-tetrakis(hydroxymethyl)-cyclohexanol, 1,10-decanediol, digitalose, and the like. The esters prepared from aliphatic alcohols containing at least three hydroxyl groups and up to fifteen carbon atoms are particularly preferred.

An especially preferred class of polyhydric alcohols for preparing the ester adducts used as starting materials in the present invention are the polyhydric alkanols containing 3 to 15, especially 3 to 6, carbon atoms and having at least 3 hydroxyl groups. Such alcohols are exemplified in the above specifically identified alcohols and are represented by glycerol, erythritol, pentaerythritol, mannitol, sorbitol, 1,2,4 hexanetriol, and tetrahydroxy pentane and the like.

The ester adducts may be di-esters of succinic acids or acidic esters, i.e., partially esterified succinic acids; as well as partially esterified polyhydric alcohols or phenols, i.e., esters having free alcohols or phenolic hydroxyl radicals. Mixtures of the above illustrated esters likewise are contemplated within the scope of this invention.

The ester adduct may be prepared by one of several known methods as illustrated for example in U.S. Pat. No. 3,381,022. The ester adduct may also be borated, similar to the nitrogen containing adduct, as described herein.

Hydroxyamines which can be reacted with the aforesaid long chain hydrocarbon substituted dicarboxylic acid material to form adducts include 2-amino-2-methyl-1-propanol, p-(beta-hydroxyethyl)-aniline, 2-amino-1-propanol, 3-amino-1-propanol, 2-amino-2-methyl-1,3-propanediol, 2-amino-2-ethyl-1,3-propanediol, N-(beta-hydroxypropyl)-N,-(beta-amino-ethyl)piperazine, tris(-hydrocymethyl) amino-methane (also known as trismethylolaminomethane), 2-amino-1-butanol, ethanolamine, diethanolamine, triethanolamine, beta-(beta-hydroxyethoxy)-ethylamine and the like. Mixtures of these or similar amines can also be employed. The above description of nucleophilic reactants suitable for reaction with the hydrocarbyl substituted dicarboxylic acid or anhydride includes amines, alcohols, and compounds of mixed amine and hydroxy containing reactive functional groups, i.e. amino-alcohols.

Also useful as nitrogen containing adducts which are reacted with the bis-keto/thioketo linking reactant to form the improved dispersants of this invention are the adducts of group (A-2) above wherein a nitrogen containing polyamine is attached directly to the long chain aliphatic hydrocarbon (as shown in U.S. Pat. Nos. 3,275,554 and 3,565,804, the disclosures of which are hereby incorporated by reference in their entirety) where the halogen group on the halogenated hydrocarbon is displaced with various alkylene polyamines.

Another class of nitrogen containing adducts which are reacted with the bis-keto/thioketo linking reactant to produce the dispersants of this invention are the adducts of group (A-3) above which contain Mannich base or Mannich condensation products as they are known in the art. Such Mannich condensation products (A-3) generally are prepared by condensing about 1 mole of a high molecular weight hydrocarbyl substituted hydroxy aromatic compound (e.g., having a number average molecular weight of 700 or greater) with about 1 to 2.5 moles of an aldehyde such as formaldehyde or paraformaldehyde and about 0.5 to 2 moles polyalkylene polyamine as disclosed, e.g., in U.S. Pat. Nos. 3,442,808; 3,649,229; and 3,798,165 (the disclosures which are hereby incorporated by reference in their entirety). Such Mannich condensation products (A-3) may include a long chain, high molecular weight hydrocarbon on the phenol group or may be reacted with a compound containing such a hydrocarbon, e.g., polyalkenyl succinic anhydride as shown in said aforementioned U.S. Pat. No. 3,442,808.

The optionally substituted hydroxy aromatic compounds used in the preparation of the Mannich base products (A-3) include those compounds having the formula

wherein Aryl represents

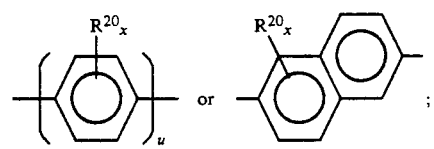

wherein u is 1 or 2, $R^{21}$ is a long chain hydrocarbon, $R^{20}$ is a hydrocarbon or substituted hydrocarbon radical having from 1 to about 3 carbon atoms or a halogen radical such as the bromide or chloride radical, y is an integer from 1 to 2, x is an integer from 0 to 2, and z is an integer from 1 to 2.

Illustrative of such Aryl groups are phenylene, biphenylene, naphthylene and the like.

The long chain hydrocarbon $R^{21}$ substituents are olefin polymers as described above for those olefin polymers useful in forming reactants A-1.

Processes for substituting the hydroxy aromatic compounds with the olefin polymer are known in the art and may be depicted as follows (Eq. 1):

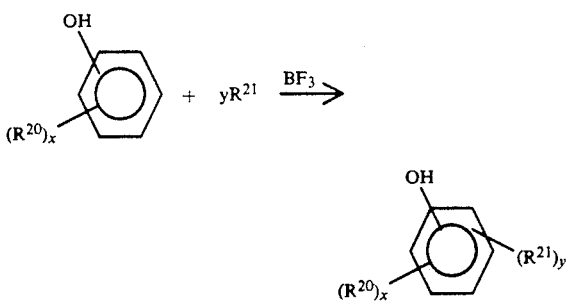

where $R^{20}$, $R^{21}$, y and x are as previously defined, and $BF_3$ is an alkylating catalyst. Processes of this type are described, for example, in U.S. Pat. Nos. 3,539,633 and 3,649,229, the disclosures of which are incorporated herein by reference.

Representative hydrocarbyl substituted hydroxy aromatic compounds contemplated for use in the present invention include, but are not limited to, 2-polypropylene phenol, 3-polypropylene phenol, 4-polypropylene phenol, 2-polybutylene phenol, 3-polyisobutylene phenol, 4-polyisobutylene phenol, 4-polyisobutylene-2-chlorophenol, 4-polyisobutylene-2-methylphenol, and the like.

Suitable hydrocarbyl-substitued polyhydroxy aromatic compounds include the polyolefin catechols, the polyolefin resorcinols, and the polyolefin hydroquinones, e.g., 4-polyisobutylene-1,2-dihydroxybenzene, 3-polypropylene-1,2-dihydroxybenzene, 5-polyisobutylene-1,3-dihydroxybenzene, 4-polyamylene-1,3-dihydroxybenzene, and the like.

Suitable hydrocarbyl-substituted naphthols include 1-polyisobutylene-5-hydroxynaphthalene, 1-polypropylene-3-hydroxynaphthalene and the like.

The preferred long chain hydrocarbyl substituted hydroxy aromatic compounds to be used in forming a Mannich Base product (A-3) for use in this invention can be illustrated by the formula:

(XVI)

wherein $R^{22}$ is hydrocarbyl of from 50 to 300 carbon atoms, and preferably is a polyolefin derived from a $C_2$ to $C_{10}$ (e.g., $C_2$ to $C_5$) mono-alpha-olefin.

The aldehyde material which can be employed in the production of the Mannich base (A-3) and (A-4) is represented by the formula:

$R^{23}CHO$ (XVII)

in which $R^{23}$ is hydrogen or an aliphatic hydrocarbon radical having from 1 to 4 carbon atoms. Examples of suitable aldehydes include formaldehyde, paraformaldehyde, acetaldehyde and the like. The polyamine materials which can be employed include those amines described above as suitable in the preparation of Reactants A-1.

Still another class of nitrogen containing adducts which are reacted with the bis-beta-keto/thioketo linking reactant to produce the dispersants of this invention are the adducts of group (A-4) above which contain Mannich base aminophenol-type condensation products as they are known in the art. Such Mannich condensation products (A-4) generally are prepared by reacting about 1 mole of long chain hydrocarbon substituted mono and dicarboxylic acids or their anhydrides with about 1 mole of amine-substituted hydroxy aromatic compound (e.g., aminophenol), which aromatic compound can also be halogen- or hydrocarbyl-sustituted, to form a long chain hydrocarbon substituted amide or imide-containing phenol intermediate adduct (generally having a number average molecular weight of 700 or greater), and condensing about a molar proportion of the long chain hydrocarbon substituted amide- or imide-containing phenol intermediate adduct with about 1 to 2.5 moles of formaldehyde and about 0.5 to 2 moles of polyamine, e.g. polyakylene polyamine.

The optionally-hydrocarbyl substituted hydroxy aromatic compounds used in the preparation of the Mannich base products (A-4) include those compounds having the formula

(XVIII)

wherein Ar, $R^{20}$, x and z are as defined above.

Preferred N-(hydroxyaryl) amine reactants to be used in forming a Mannich Base product (A-4) for use in this invention are amino phenols of the formula:

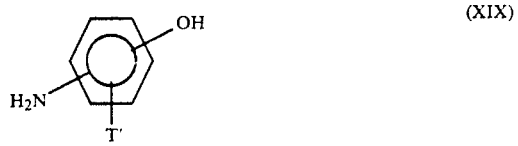
(XIX)

in which T' is hydrogen, an alkyl radical having from 1 to 3 carbon atoms, or a halogen radical such as the chloride or bromide radical.

Suitable aminophenols include 2-aminophenol, 3-aminophenol, 4-aminophenol, 4-amino-3-methylphenol, 4-amino-3-chlorophenol, 4-amino-2-bromophenol and 4-amino-3-ethylphenol.

Suitable amino-substituted polyhydroxyaryls are the aminocatechols, the amino resorcinols, and the aminohydroquinones, e.g., 4-amino-1,2- dihydroxybenzene, 3-amino-1,2-dihydroxybenzene, 5-amino-1,3-dihydroxybenzene, 4-amino-1,3-dihydroxybenzene, 2-amino-1,4-dihydroxybenzene, 3-amino-1,4-dihydroxybenzene and the like.

Suitable aminonaphthols include 1-amino-5-hydroxynaphthalene, 1-amino-3-hydroxynaphthalene and the like.

The long chain hydrocarbyl substituted mono- or dicarboxylic acid or anhydride materials useful for reaction with the amine-substituted aromatic compound to prepare the amide or imide intermediates in the formation of Reactant A-4 can comprise any of those decribed above which are useful in preparing the reactant A-1. The foregoing adducts of the selected and amine-substituted aromatic compound can then be contacted with an aldehyde and amine for the Mannich Base reaction as described above. The aldehyde and amine can comprise any of those described above as being useful in formation of the Reactant A-3 materials.

In one preferred aspect of this invention, the dispersant adducts A-4 are prepared by reacting the olefin polymer substituted mono- or dicarboxylic acid material with the N-(hydroxyaryl) amine material to form a carbonyl-amino material containing at least one group having a carbonyl group bonded to a secondary or a tertiary nitrogen atom. In the amide form, the carbonyl-amino material can contain 1 or 2 —C(O)—NH— groups, and in the imide form the carbonyl-amino material will contain —C(O)—N—C(O)— groups. The carbonyl-amino material can therefore comprise N-(hydroxyaryl) polymer-substituted dicarboxylic acid diamide, N-(hydroxyaryl) polymer-substituted dicarboxylic acid imide, N-(hydroxyaryl) polymer substituted-monocarboxylic acid monoamide, N-(hydroxyaryl) polymer-substituted dicarboxylic acid monoamide or a mixture thereof.

In general, amounts of the olefin polymer substituted mono- or dicarboxylic acid material, such as olefin polymer substituted succinic anhydride, and of the N-(hydroxyaryl) amine, such as p-aminophenol, which are effective to provide about one equivalent of a dicarboxylic acid or anhydride moiety or monocarboxylic acid moiety per equivalent of amine moiety are dissolved in an inert solvent (i.e. a hydrocarbon solvent such as toluene, xylene, or isooctane) and reacted at a moderately elevated temperature up to the reflux temperature of the solvent used, for sufficient time to complete the formation of the intermediate N-(hydroxyaryl) hydrocarbyl amide or imide. When an olefin polymer substituted monocarboyxlic acid material is used, the resulting intermediate which is generally formed comprises amide groups. Similarly, when an olefin polymer substituted dicarboxylic acid material is used, the resulting intermediate generally comprises imide groups, although amide groups can also be present in a portion of the carbonyl-amino material thus formed. Thereafter, the solvent is removed under vacuum at an elevated temperature, generally, at approximately 160° C.

Alternatively, the intermediate is prepared by combining amounts of the olefin polymer substituted mono- or dicarboxylic acid material sufficient to provide about one equivalent of dicarboxylic acid or anhydride moiety or monocarboyxlic acid moiety per equivalent of amine moiety (of the N-(hydroxyaryl) amine) and the N-(hydroxyaryl) amine, and heating the resulting mixture at elevated temperature under a nitrogen purge in the absence of solvent.

The resulting N-(hydroxyaryl) polymer substituted imides can be illustrated by the succinimides of the formula (XX):

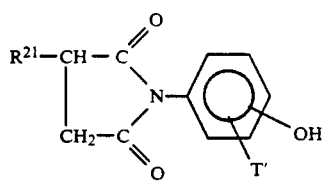

wherein T' is as defined above, and wherein $R^{21}$ is as defined above. Similarly, when the olefin polymer substituted monocarboxylic acid material is used, the resulting N-(hydroxyaryl) polymer substituted amides can be represented by the propionamides of the formula (XXI):

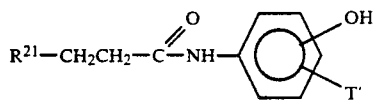

wherein T' and $R^{21}$ are as defined above.

In a second step, the carbonyl-amino intermediate is reacted with an amine compound (or mixture of amine compounds), such as a polyfunctional amine, together with an aldehyde (e.g., formaldehyde) in the Mannich base reaction. In general, the reactants are admixed and reacted at an elevated temperature until the reaction is complete. This reaction may be conducted in the presence of a solvent and in the presence of a quantity of mineral oil which is an effective solvent and for the finished Mannich base dispersant material. This second step can be illustrated by the Mannich base reaction between the above N-(hydroxyphenyl) polymer succinimide intermediate, paraformaldehyde and ethylene diamine in accordance with the following equation:

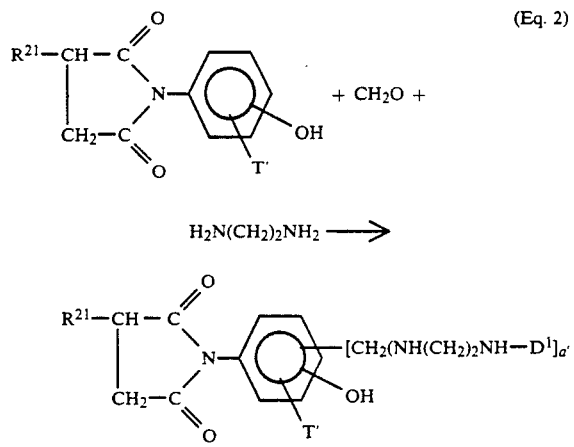

(Eq. 2)

wherein a' is an integer of 1 or 2, $R^{21}$ and T' are as defined above, and $D^1$ is H or the moiety

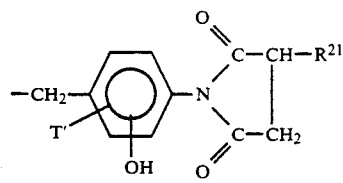

wherein $R^{21}$ and T' are as defined above. Similarly, this second step can be illustrated by the Mannich base reaction between the above N-(hydroxyphenyl) polymer acrylamide intermediate, paraformaldehyde and ethylene diamine in accordance with the following equation:

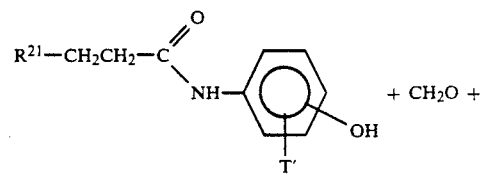

(Eq. 3)

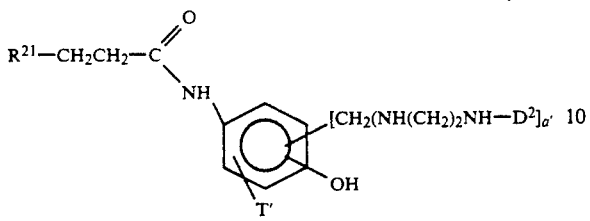

wherein a' is an integer of 1 or 2, $R^{21}$ and T' are as defined above, and $D^2$ is H or the moiety

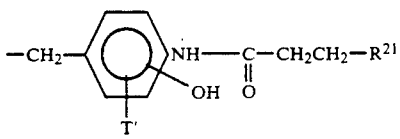

wherein $R^{21}$ and T' are as defined above.

Generally, the reaction of one mole of the carbonyl-amino material, e.g. a N-(hydroxyaryl) polymer succimide or amide intermediate, with two moles of aldehyde and one mole of amine will favor formation of the products comprising two moieties of bridged by an -alk-amine-alk- group wherein the "alk" moieties are derived from the aldehyde (e.g., —$CH_2$— from $CH_2O$) and the "amine" moiety is a bivalent bis-N terminated amino group derived from the amine reactant (e.g., from polyalkylene polyamine). Such products are illustrated by Equations 2 and 3 above wherein a' is one, $D^1$ is the moiety

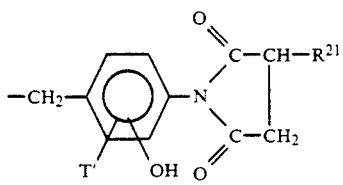

and $D^2$ is the moiety

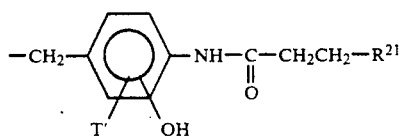

wherein T' and $R^{21}$ are as defined above.

In a similar manner, the reaction of substantially equimolar amounts of the carbonyl-amino material, aldehyde and amine reactant favors the formation of products illustrated by Equations 2 and 3 wherein "a'" is one and $D^1$ and $D^2$ are each H, and the reaction of one mole of carbonyl-amino material with two moles of aldehyde and two moles of the amine reactant permits the formation of increased amounts of the products illustrated by Equations 2 and 3 wherein "a'" is 2 and $D^1$ and $D^2$ are each H.

In preparing Reactants A-4, the order of reacting the various reactants can be modified such that, for example, the N-hydroxyaryl amine is first admixed and reacted with the amine material and aldehyde in the Mannich base reaction to form an aminomethyl hydroxyaryl amine material. Thereafter, the resulting intermediate adduct is reacted with the olefin polymer substituted mono- or dicarboxylic acid material to form the desired dispersant. The sequence of reactions performed in accordance with this aspect of the invention tends to result in the formation of various dispersant isomers because of the plurality of aromatic materials formed in the first Mannich base condensation step and the primary and secondary nitrogen atoms which are available for reaction with the carboxy moieties of the mono- or dicarboxylic acid materials.

The Mannich base intermediate adduct A-4 formed by the reaction of the N-hydroxyaryl amine with the amine reactant and formaldehyde can comprise at least one compound selected from the group consisting of:

(a) adducts of the structural formula (XXII):

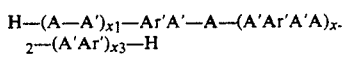

wherein $x_1$ is 0 or 1, $x_2$ is an integer of 0 to 8, $x_3$ is 0 or 1, A is a bivalent bis-N terminated amino group derived from the amine reactant and comprises an amine group containing from 2 to 60 (preferably from 2 to 40) carbon atoms and from 1 to 12 (preferably from 3 to 13) nitrogen atoms, and A' comprises the group —CH(T")— wherein T" is H or alkyl of from 1 to 9 carbon atoms and is derived from the corresponding aldehyde reactant, and Ar' comprises the moiety (XXIII):

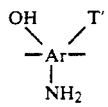

wherein T' and Ar are as defined above for the N-hydroxyaryl amines employed in this invention; and (b) adducts of the structure (XXIV):

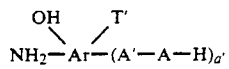

wherein a', T', A', A and Ar are as defined above. Preferred adducts of formula XXII above are those wherein $x_1$ is 0, $x_2$ is 1 to 3, and $x_3$ is 1, and most preferably wherein T' is H or alkyl of 1 to 3 carbon atoms and Ar is phenylene. Preferred adducts of formula XXIV are those wherein Ar is phenylene.

Preferably, the "A" bivalent amino group will comprise terminal —NH— groups, as exemplified by the structures of the formula (XXV):

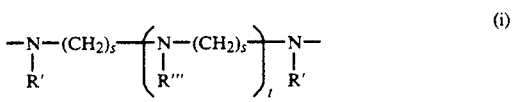

(i)

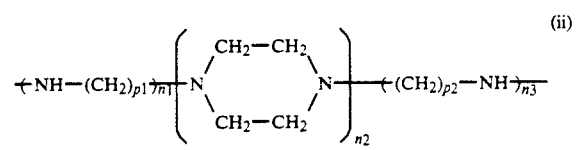

(ii)

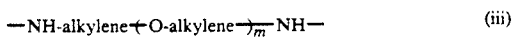

(iii)

-continued $$-Z^5-(\overset{D^5}{\underset{|}{C}}-\overset{D^7}{\underset{|}{C}}-\overset{X}{\underset{\|}{C}})-Z^5- \qquad (iv)$$

wherein $Z^5$ comprises at least one member selected from the group consisting of (XXV) (i), (ii) and (iii) above, wherein R', R''', t and s are as defined above with respect to Formula I; $P_1$, $P_2$, $n_1$, $n_2$ and $n_3$ are as defined above with respect to Formula III; "alkylene" and "m" are as defined above with respect to Formula IV; and $D^5$, $D^7$ and X are as defined above with respect to Formula VI.

Illustrative adducts of structure XXIV are set forth in Table I below:

TABLE I

| $x_1$ | $x_2$ | $x_3$ | Ar' | A' | A |
|---|---|---|---|---|---|
| 0 | 2 | 1 | —Ph(OH)(NH$_2$)— | —CH$_2$— | —NH(Et)NH(Et)NH— |
| 0 | 2 | 1 | " | " | —NH(Et)(NH(Et))$_3$NH— |
| 0 | 1 | 0 | " | " | —NH(Et)NH(Et)NH— |
| 0 | 0 | 0 | " | " | —NH(Et)(NH(Et))$_3$NH— |
| 0 | 1 | 1 | " | " | —NH(Et)NH(Et)NH— |
| 0 | 1 | 1 | " | " | —NH(Et)(NH(Et))$_3$NH— |
| 1 | 2 | 0 | " | —CH(CH$_3$)— | —NH(Et)NH(Et)NH— |
| 1 | 0 | 1 | " | " | —NH(Et)(NH(Et))$_5$NH— |
| 1 | 3 | 0 | " | " | —NH(Et)(NH(Et))$_5$NH— |
| 1 | 1 | 0 | " | " | —NH(Et)(NH(Et))$_5$NH— |
| 1 | 1 | 1 | " | " | —NH(Et)(NH(Et))$_5$NH— |
| 0 | 2 | 1 | " | " | —NH(Et)(NH(Et))$_6$NH— |

(Ph = phenyl; Et = C$_2$H$_4$)

Illustrative adducts of structure XXIII are set forth below wherein Ar is tri- or tetra-substituted phenyl:

TABLE II

| a | T' | A' | A |
|---|---|---|---|
| 1 | H | —CH$_2$— | —NH(Et)NH(Et)NH— |
| 2 | CH$_3$ | " | —NH(Et)(NH(Et))$_3$NH— |
| 1 | CH$_3$ | " | —NH(Et)NH(Et)NH— |
| 2 | C$_2$H$_5$ | " | —NH(Et)(NH(Et))$_5$NH— |
| 1 | C$_3$H$_7$ | " | —NH(Et)NH(Et)NH— |
| 2 | C$_4$H$_9$ | " | —NH(Et)(NH(Et))$_6$NH— |
| 1 | H | —CH(CH$_3$)— | —NH(Et)NH(Et)NH— |
| 2 | CH$_3$ | " | —NH(Et)(NH(Et))$_5$NH— |

(Et = C$_2$H$_4$)

For the sake of illustration, this aspect of the invention may be represented by the following equations (wherein $R^{21}$, T' and a' are as defined above):

Dicarboxylic acid materials:

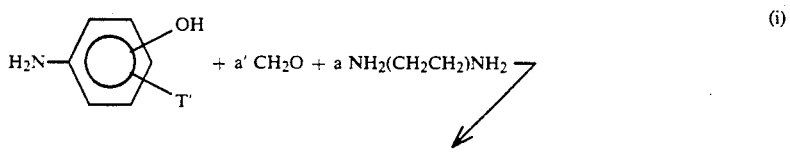 (i)

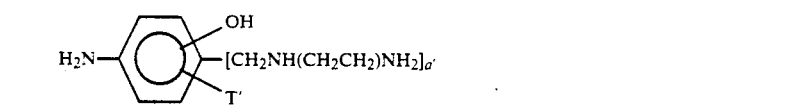

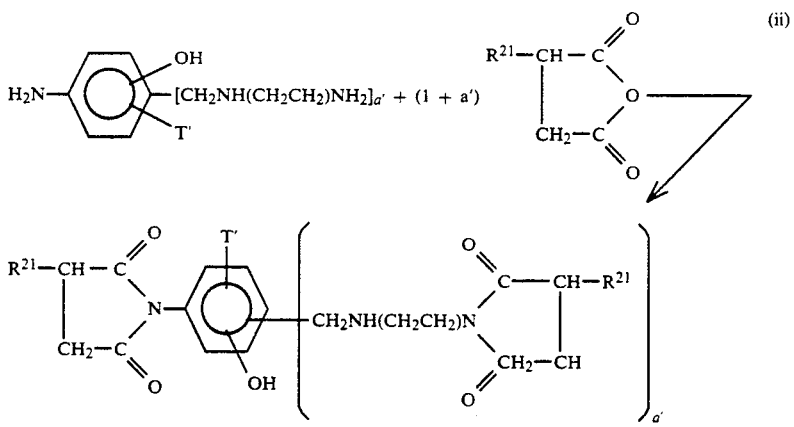 (ii)

Monocarboxylic acid materials:

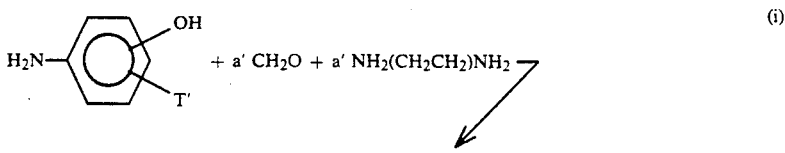 (i)

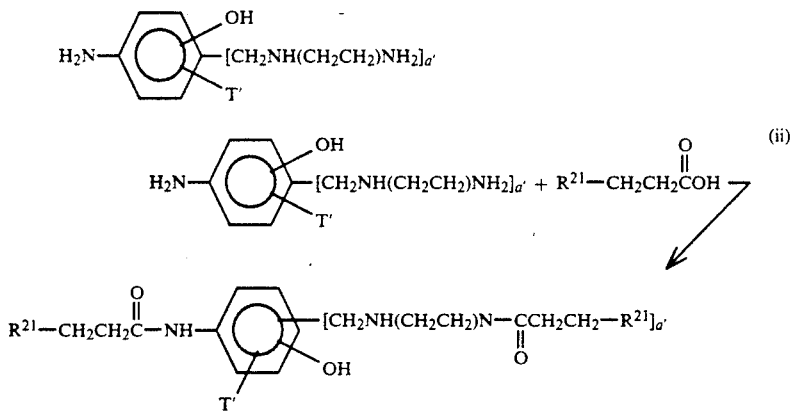

In one embodiment of the preparation of Reactants A-4, a carbonyl-amino material comprising a polyisobutylene substituted hydroxyaryl succinimide, which has been prepared by first reacting an polyisobutylene succinic anhydride with an aminophenol to form an intermediate product, is reacted with formaldehyde and a mixture of poly(ethyleneamines) in the Mannich base reaction as outlined above to form the Reactant A-4 adducts. In another embodiment, an aminophenol is first reacted with formaldehyde and a mixture of poly(ethyleneamines) in the Mannich base reaction as outlined above to form an intermediate material containing from one to three (polyamino)methyl-substituted aminohydroxy aryl groups per molecule, followed by reacting this intermediate with an polyisobutylene succinic anhydride to form the Mannich Base A-4 adducts. A preferred group of Mannich Base A-4 adducts are those formed by condensing polymer with formaldehyde and polyethylene amines, e.g., tetraethylene pentamine, pentaethylene hexamine, polyoxyethylene and polyoxypropylene amines, e.g., polyoxypropylene diamine, and combinations thereof. One particularly preferred dispersant combination involves a condensation of (a″) polymer substitued succinic anhydride or propionic acid, (b″) aminophenol, (c″) formaldehyde, and (d″) at least one of (d″$_1$) a polyoxyalkylene polyamine, e.g., polyoxypropylene diamine, and (d″$_2$) a polyalkylene polyamine, e.g. polyethylene diamine and tetraethylene pentamine, using a a″:b″:c″:d″ molar ratio of 1:1-8:1:0-.1-10, and preferably 1:2-6:1:1-4, wherein the a″:(d″$_1$)(d″$_2$) molar ratio is 1:0-5:0-5, and preferably 1:0-4:1-4.

Most preferably, when the aldehyde comprises formaldehyde (or a material which generates formaldehdye in situ), and the amine comprises a di-primary amine (e.g., polyalkylene polyamine), the formaldehyde and diprimary amine are employed in an amount of about 2(q-1) moles of formaldehyde and about (q-1) moles of diprimary amine per "q" molar equivalents charged of the hydroxy-aryl group.

In a preferred embodiment of the instant invention the adducts which are reacted with the bis-keto/thioketo linking reactant to form the dispersants of this invention are the nitrogen containing adducts of group (A-1) above, i.e., those derived from a hydrocarbyl substituted mono- or dicarboxylic acid forming material (acids or anhydrides) and reacted with polyamines. Particularly preferred adducts of this type are those derived from polyisobutylene substituted with succinic anhydride or propionic acid groups and reacted with polyethylene amines, e.g. tetraethylene pentamine, pentaethylene hexamine, polyoxyethylene and polyoxypropylene amines, e.g. polyoxypropylene diamine, trismethylolaminoethane and combinations thereof.

Utilizing this preferred group of nitrogen containing adducts, the dispersants of the instant invention may be characterized as acylated nitrogen derivatives of hydrocarbyl substituted dicarboxylic materials comprising the reaction products of:

(A) reaction products of (1) a long chain hydrocarbyl substituted dicarboxylic acid producing material, and (2) a polyamine; subsequently reacted with (B) a bis-keto/thioketo ester/thioester linking reactant.

Reactant B

The bis-keto/thioketo ester/thioester linking reactants useful in the instant invention are generally commercially available or may readily be prepared by conventional and well known methods.

The bis-keto/thioketo ester/thioester reactants possess one

group, and one

group, wherein n is zero or an integer from 1 to 10, $X^1$-$X^6$ are the same or different and are O or S, and $R^1$-$R^6$ are the same or different and are H or substituted or unsubstituted hydrocarbyl. The —C($X^3$)— and —C($X^4$)— groups can be bonded directly (i.e. —C($X^3$)—C($X^4$)—) or linked through a divalent hydrocarbyl group. Preferably, n is 0 or 1, and most preferably n is 1 and the bis-keto/thioketo ester/thioester reactants comprise bis-beta-keto/thioketo ester/thioester compounds.

The preferred bis-beta-keto/thioketo ester/thioester linking reactants include those represented by the general formulae:

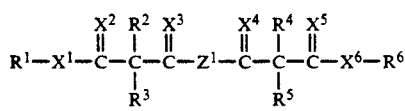

and

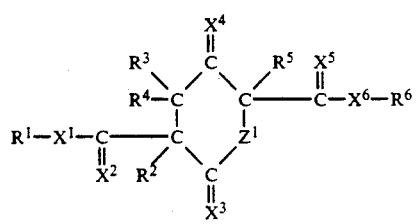

wherein $R^1$, $R^2$, $R^3$, $R^4$, $R^5$ and $R^6$ are independently selected from the group consisting of H and substituted or unsubstituted hydrocarbyl, $Z^1$ is divalent hydrocarbyl, which can be substituted or unsubstituted, and $X^1$, $X^2$, $X^3$, $X^4$, $X^5$ and $X^6$ are the same or different and are O or S. Preferably, at least one of $R^2$ and $R^3$ and at least one of $R^4$ and $R^5$ is H.

When $R^1$, $R^2$, $R^3$, $R^4$, $R^5$ and $R^6$ are hydrocarbyl groups, the hydrocarbyl group can comprise alkyl, cycloalkyl, aryl, aralkyl, alkaryl, alkenyl, alkynyl, cycloalkenyl, heterocyclic and substituted derivatives thereof wherein the substitutent comprises —OH, halide, nitro, ester, nitrile, keto and the like. Generally, the hydrocarbyl group will contain from 1 to 12, preferably from 1 to 8, and more preferably from 1 to 4 carbon atoms.

When $R^1$, $R^2$, $R^3$, $R^4$, $R^5$ and $R^6$ are alkyl, the alkyl group will generally contain from 1 to 12, preferably from 1 to 4, carbon atoms, and can be branched or straight chained. Exemplary of such alkyl groups are methyl, ethyl, propyl, butyl, iso-butyl, ter-butyl, pentyl, hexyl, 2-ethyl-hexyl, and the like.

When $R^1$, $R^2$, $R^3$, $R^4$, $R^5$ and $R^6$ are cycloalkyl, the cycloalkyl group will generally contain from 3 to 12, preferably from 3 to 6, carbon atoms. The cycloalkyl radicals may contain alkyl substituents, e.g., $C_1$–$C_8$ alkyl, on one or more ring carbon atoms. Exemplary of such cycloalkyl groups are cyclopropyl, cyclobutyl, cyclopentyl, cyclohexyl, 2-ethylcyclohexyl, cyclooctyl, cyclodecyl, and the like.

When $R^1$, $R^2$, $R^3$, $R^4$, $R^5$ and $R^6$ are alkenyl, the alkenyl group will generally contain from 2 to 12, preferably from 2 to 4, carbon atoms, and can be branched or straight chained. Exemplary of such alkenyl groups are ethenyl, propenyl, butenyl, iso-butenyl, ter-butenyl, pentenyl, hexenyl, 2-ethyl-hexen-3-yl, and the like.

When $R^1$, $R^2$, $R^3$, $R^4$, $R^5$ and $R^6$ are aryl, the aryl group will generally contain from 6 to 12, preferably from 6 to 8, carbon atoms. Exemplary of such aryl groups are phenyl, naphthyl, and the like.

When $R^1$, $R^2$, $R^3$, $R^4$, $R^5$ and $R^6$ are alkaryl or aralkyl, the alkaryl or aralkyl group will generally contain a total of from 7 to 12, preferably from 7 to 8, carbon atoms, and the aryl group will generally contain from 6 to 12, preferably from 6 to 8, carbon atoms, and the alkyl group will generally contain from 1 to 6, preferably from 1 to 4, carbon atoms, and can be branched or straight chained. Exemplary of such alkaryl and aralkyl groups are tolyl, xylyl, cresyl, meta-cresyl, para-cresyl, ethylbenzyl, propylbenzyl, methylnaphthyl, propylphenyl, 2-ethyl-hexylphenyl, and the like.

When $R^1$, $R^2$, $R^3$, $R^4$, $R^5$ and $R^6$ are alkynyl, the alkynyl group will generally contain from 2 to 12, preferably from 2 to 4, carbon atoms, and can be branched or straight chained. Exemplary of such alkynyl groups are ethynyl, propynyl, butynyl, pentynyl, hexynyl, 2-ethyl-hexyn-3-yl, and the like.

When $R^1$, $R^2$, $R^3$, $R^4$, $R^5$ and $R^6$ are heterocyclic, the heterocyclic group will generally contain from 3 to 12, preferably from 3 to 6, atoms in the hetero-ring, wherein the ring qenerally contains from 2 to 8, preferably from 4 to 6, carbon atoms, and from 1 to 5, preferably to 3, hetero atoms. Preferably, the hetero atoms comprise O,S or N. Exemplary of such heterocyclic groups are pyridyl, piperidyl, and the like.

The $Z^1$ divalent hydrocarbyl group will generally contain from to 12 carbon atoms, preferably from 1 to 6 carbon atoms. The $Z^1$ groups will include straight and branched chain alkylene of the formula $-C_nH_{2n}-$, wherein n is an integer of from 1 to 12, preferably from 1 to 6; groups of the formula:

$$-Ar''-((alkylene)-Ar'')_{m''}- \qquad (XXVIII)$$

and $$-alkylene-(Ar''-alkylene)_{m''}- \qquad (XXIX)$$

wherein m″ is an integer of from 0 to 4, wherein Ar″ in each instance in which it appears is independently selected from the group consisting of arylene of from 4 to 12 carbon atoms and alkyl-substituted arylene of from 9 to 12 carbon atoms, and wherein "alkylene" in formulae XXVIII and XXIX is $-C_nH_{2n}-$, wherein "n" is as defined above; cycloalkylene of from 3 to 12 carbon atoms; and the like, wherein the $Z^1$ groups can be substituted or unsubstituted as described above for the $R^1$ through $R^6$ groups.

Therefore, the preferred bis-beta keto/thioketo reactants employed in this invention include alicyclic bis-beta-keto compounds of the formula:

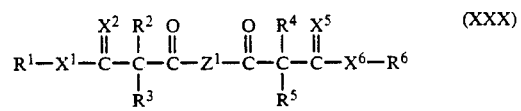

and cyclic bis-beta-keto compounds of the formula:

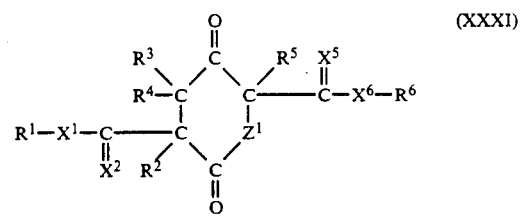

wherein $R^1$ through $R^6$, $Z^1$, $X^1$, $X^2$, $X^5$ and $X^6$ are as defined above.

Correspondingly, the bis-beta-thioketo compounds which can be employed in the present invention include compounds of the formula:

$$R^1-X^1-\overset{X^2}{\overset{\|}{C}}-\overset{R^2}{\overset{|}{\underset{R^3}{C}}}-\overset{S}{\overset{\|}{C}}-Z^1-\overset{S}{\overset{\|}{C}}-\overset{R^4}{\overset{|}{\underset{R^5}{C}}}-\overset{X^5}{\overset{\|}{C}}-X^6-R^6 \quad (XXII)$$

and cyclic bis-beta-thioketo compounds of the formula:

(XXXIII)

wherein $R^1$ through $R^6$, $Z^1$, $X^1$, $X^2$, $X^5$ and $X^6$ are as defined above.

The bis-beta thioketo carboxylic esters useful in this invention include compounds of the formula XXXII and XXXIII wherein $X^1$, $X^2$, $X^5$ and $X^6$ are each O. The bis-beta thioketo carboxylic thioesters useful in this invention include compounds of the formula XXXII and XXXIII wherein $X^1$ and $X^6$ are each S and $X^2$ and $X^5$ are each O. The bis-beta thioketo thiocarboxylic thioesters useful in this invention include compounds of the formula XXXII and XXXIII wherein $X^1$, $X^2$, $X^5$ and $X^6$ are each S. The bis-beta thioketo thiocarboxylic esters useful in this invention include compounds of the formula XXXII and XXXIII wherein $X^1$ and $X^6$ are each O and $X^2$ and $X^5$ are each S.

The bis-beta keto carboxylic esters useful in this invention include compounds of the formula XXX and XXXI wherein $X^1$, $X^2$, $X^5$ and $X^6$ are each O. The bis-beta keto carboxylic thioesters useful in this invention include compounds of the formula XXX and XXXI wherein $X^1$ and $X^6$ are each S and $X^2$ and $X^5$ are each O. The bis-beta keto thiocarboxylic thioesters useful in this invention include compounds of the formula XXX and XXXI wherein $X^1$, $X^2$, $X^5$ and $X^6$ are each S. The bis-beta keto thiocarboxylic esters useful in this invention include compounds of the formula XXX and XXXI wherein $X^1$ and $X^6$ are each O and $X^2$ and $X^5$ are each S.

Preferred are bis-beta keto compounds and bis-beta thioketo compounds of Formula XXVI and XXVII wherein $X^2$ and $X^5$ and O, and more preferably wherein $X^1$ and $X^6$ are each O. Most preferred are bis-beta keto esters of formula XXVI and XXVII wherein $X^1$-$X^6$ are each O, $Z^1$ is $C_1$ to $C_4$ alkylene, $R^1$ and $R^6$ are independently each H or $C_1$ to $C_4$ alkyl, and $R^2$ through $R^5$ are independently each H or $C_1$ to $C_4$ alkyl.

Exemplary bis-beta keto compounds of Formula XXVI are set forth below:

(a) bis-beta keto carboxylic esters:
HO—C(O)CH₂C(O)—C₂H₄—C(O)CH₂C(O)—OH
CH₃O—C(O)CH₂C(O)—C₃H₆—C(O)CH₂-C(O)—OCH₃
C₂H₅O—C(O)CH₂C(O)—C₄H₈—C(O)CH₂-C(O)—OC₂H₅
C₃H₇O—C(O)CH₂C(O)—C₂H₄—C(O)CH₂-C(O)—OC₃H₇
C₆H₅O—C(O)CH₂C(O)—C₂H₄—C(O)CH₂-C(O)—OC₆H₅
(CH₃)C₆H₄O—C(O)CH₂C(O)—C₂H₄—C(O)CH₂-C(O)—OC₆H₄(CH₃)

(b) bis—beta keto carboxylic thioesters:
HS—C(O)CH₂C(O)—C₂H₄—C(O)CH₂C(O)—SH
CH₃S—C(O)CH₂C(O)—C₃H₆—C(O)CH₂-C(O)—SCH₃
C₂H₅S—C(O)CH₂C(O)—C₄H₈—C(O)CH₂-C(O)—SC₂H₅
C₃H₇S—C(O)CH₂C(O)—C₂H₄—C(O)CH₂-C(O)—SC₃H₇
C₆H₅S—C(O)CH₂C(O)—C₂H₄—C(O)CH₂-C(O)—SC₆H₅
(CH₃)C₆H₄S—C(O)CH₂C(O)—C₂H₄—C(O)CH₂-C(O)—SC₆H₄(CH₃)

(c) bis-beta keto thiocarboxylic esters:
HO—C(S)CH₂C(O)—C₂H₄—C(O)CH₂C(S)—OH
CH₃O—C(S)CH₂C(O)—C₃H₆—C(O)CH₂C(-S)—OCH₃
C₂H₅O—C(S)CH₂C(O)—C₄H₈—C(O)CH₂C(-S)—OC₂H₅
C₃H₇O—C(S)CH₂C(O)—C₂H₄—C(O)CH₂C(-S)—OC₃H₇
C₆H₅O—C(S)CH₂C(O)—C₂H₄—C(O)CH₂C(-S)—OC₆H₅
(CH₃)C₆H₄O—C(S)CH₂C(O)—C₂H₄—C(O)CH₂C(-S)—OC₆H₄(CH₃)

(d) bis-beta keto thiocarboxylic thioesters:
HS—C(S)CH₂C(O)—C₂H₄—C(O)CH₂C(S)—SH
CH₃S—C(S)CH₂C(O)—C₃H₆—C(O)CH₂C(S)—SCH₃
C₂H₅S—C(S)CH₂C(O)—C₄H₈—C(O)CH₂C(-S)—SC₂H₅
C₃H₇S—C(S)CH₂C(O)—C₂H₄—C(O)CH₂C(-S)—SC₃H₇
C₆H₅S—C(S)CH₂C(O)—C₂H₄—C(O)CH₂C(-S)—SC₆H₅
(CH₃)C₆H₄S—C(S)CH₂C(O)—C₂H₄—C(O)CH₂C(-S)—SC₆H₄(CH₃)

Exemplary bis—beta thioketo compounds of Formula XXXII are set forth below:

(a) bis-beta thioketo carboxylic esters:
HO—C(O)CH₂C(S)—C₂H₄—C(S)CH₂C(O)—OH
CH₃O—C(O)CH₂C(S)—C₃H₆—C(S)CH₂-C(O)—OCH₃
C₂H₅O—C(O)CH₂C(S)—C₄H₈—C(S)CH₂-C(O)—OC₂H₅
C₃H₇O—C(O)CH₂C(S)—C₂H₄—C(S)CH₂-C(O)—OC₃H₇
C₆H₅O—C(O)CH₂C(S)—C₂H₄—C(S)CH₂-C(O)—OC₆H₅
(CH₃)C₆H₄O—C(O)CH₂C(S)—C₂H₄—C(S)CH₂-C(O)—OC₆H₄(CH₃)

(b) bis-beta thioketo carboxylic thioesters:
HS—C(O)CH₂C(S)—C₂H₄—C(S)CH₂C(O)—SH
CH₃S—C(O)CH₂(C(S)—C₃H₆—C(S)CH₂-C(O)—SCH₃
C₂H₅S—C(O)CH₂C(S)—C₄H₈—C(S)CH₂-C(O)—SC₂H₅
C₃H₇S—C(O)CH₂C(S)—C₂H₄—C(S)CH₂-C(O)—SC₃H₇
C₆H₅S—C(O)CH₂C(S)—C₂H₄—C(S)CH₂-C(O)—SC₆H₅
(CH₃)C₆H₄S—C(O)CH₂C(S)—C₂H₄—C(S)CH₂-C(O)—SC₆H₄(CH₃)

(c) bis-beta thioketo thiocarboxylic esters:
HO—C(S)CH₂C(S)—C₂H₄—C(S))CH₂C(S)—OH CH₃O—C(S)CH₂C(S)—C₃H₆—C(S)CH₂C(S)—OCH₃
C₂H₅O—C(S)CH₂C(S)—C₄H₈—C(S)CH₂C(S)—OC₂H₅
C₃H₇O—C(S)CH₂C(S)—C₂H₄—C(S)CH₂C(S)—OC₃H₇
C₆H₅O—C(S)CH₂C(S)—C₂H₄—C(S)CH₂C(S)—OC₆H₅
(CH₃)C₆H₄O—C(S)CH₂C(S)—C₂H₄—C(S)CH₂C(S)—OC₆H₄(CH₃)

C₂H₅S—C(S)CH₂C(S)—C₄H₈—C₄H₈—C(S)CH₂C(S)—SC₂H₅
C₃H₇S—C(S)CH₂C(S)—C₂H₄—C(S) ch₂C(S)—SC₃H₇
C₆H₅S—C(S)CH₂C(S)—C₂H₄—C(S)CH₂C(S)—SC₆H₅
(CH₃)C₆H₄S—C(S)CH₂C(S)—C₂H₄—C(S)CH₂C(S)—SC₆H₄(CH₃)

Exemplary bis-beta keto compounds of Formula XXXI are set forth in Table III below:

TABLE III

| R¹X¹ | X² | X⁵ | R² | R³ | R⁴ | R⁵ | Z¹ | X⁶R⁶ |
|---|---|---|---|---|---|---|---|---|
| HO— | O | O | H | H | H | H | —CH₂— | —OH |
| CH₃O— | O | O | H | H | H | H | —CH₂— | —OCH₃ |
| C₂H₅O— | O | O | H | H | H | H | —C₂H₄— | —OC₂H₅ |
| C₃H₇O— | O | O | H | H | H | H | —CH₂— | —OC₃H₇ |
| C₆H₅O— | O | O | H | H | H | H | —CH₂— | —OC₆H₅ |
| CH₃C₆H₄O— | O | O | H | H | H | H | —CH₂— | —OC₆H₄(CH₃) |
| (CH₃)₂C₆H₃O— | O | O | H | H | H | H | —CH₂— | —OC₆H₃(CH₃)₂ |
| HS— | O | O | H | H | H | H | —CH₂— | —SH |
| CH₃S— | O | O | H | H | H | H | —CH₂— | —SCH₃ |
| C₂H₅S— | O | O | H | H | H | H | —C₂H₄— | —SC₂H₅ |
| C₃H₇S— | O | O | H | H | H | H | —CH₂— | —SC₃H₇ |
| C₆H₅S— | O | O | H | H | H | H | —CH₂— | —SC₆H₅ |
| CH₃C₆H₄S— | O | O | H | H | H | H | —CH₂— | —SC₆H₄(CH₃) |
| (CH₃)₂C₆H₃S— | O | O | H | H | H | H | —CH₂— | —SC₆H₃(CH₃)₂ |
| HO— | S | S | H | H | H | H | —CH₂— | —OH |
| CH₃O— | S | S | H | H | H | H | —CH₂— | —OCH₃ |
| C₂H₅O— | S | S | H | H | H | H | —C₂H₄— | —OC₂H₅ |
| C₃H₇O— | S | S | H | H | H | H | —CH₂— | —OC₃H₇ |
| C₆H₅O— | S | S | H | H | H | H | —CH₂— | —OC₆H₅ |
| CH₃C₆H₄O— | S | S | H | H | H | H | —CH₂— | —OC₆H₄(CH₃) |
| (CH₃)₂C₆H₃O— | S | S | H | H | H | H | —CH₂— | —OC₆H₃(CH₃)₂ |
| HS— | S | S | H | H | H | H | —CH₂— | —SH |
| CH₃S— | S | S | H | H | H | H | —CH₂— | —SCH₃ |
| C₂H₅S— | S | S | H | H | H | H | —C₂H₄— | —SC₂H₅ |
| C₃H₇S— | S | S | H | H | H | H | —CH₂— | —SC₃H₇ |
| C₆H₅S— | S | S | H | H | H | H | —CH₂— | —SC₆H₅ |
| CH₃C₆H₃S— | S | S | H | H | H | H | —CH₂— | —SC₆H₃(CH₃) |
| (CH₃)₂C₆H₄S— | S | S | H | H | H | H | —CH₂— | —SC₆H₄(CH₃)₂ |

(d) bis-beta thioketo thiocarboxylic thioesters:
HS-C(S)CH₂C(S)—C₂H₄—C(S)CH₂C(S)—SH
CH₃S—C(S)CH₂C(S)—C₃H₆—C(S)CH₂C(S)-SCH₃

Exemplary bis-beta thioketo compounds of Formula XXXIII are set forth in Table IV below:

TABLE IV

| R¹X¹ | X² | X⁵ | R² | R³ | R⁴ | R⁵ | Z¹ | X⁶R⁶ |
|---|---|---|---|---|---|---|---|---|
| HO— | O | O | H | H | H | H | —CH₂— | —OH |
| CH₃O— | O | O | H | H | H | H | —CH₂— | —OCH₃ |
| C₂H₅O— | O | O | H | H | H | H | —C₂H₄— | —OC₂H₅ |
| C₃H₇O— | O | O | H | H | H | H | —CH₂— | —OC₃H₇ |
| C₆H₅O— | O | O | H | H | H | H | —CH₂— | —OC₆H₅ |
| CH₃C₆H₄O— | O | O | H | H | H | H | —CH₂— | —OC₆H₄(CH₃) |
| (CH₃)₂C₆H₃O— | O | O | H | H | H | H | —CH₂— | —OC₆H₃(CH₃)₂ |
| HS— | O | O | H | H | H | H | —CH₂— | —SH |
| CH₃S— | O | O | H | H | H | H | —CH₂— | —SCH₃ |
| C₂H₅S— | O | O | H | H | H | H | —C₂H₄— | —SC₂H₅ |
| C₃H₇S— | O | O | H | H | H | H | —CH₂— | —SC₃H₇ |
| C₆H₅S— | O | O | H | H | H | H | —CH₂— | —SC₆H₅ |
| CH₃C₆H₄S— | O | O | H | H | H | H | —CH₂— | —SC₆H₄(CH₃) |
| (CH₃)₂C₆H₃S— | O | O | H | H | H | H | —CH₂— | —SC₆H₃(CH₃)₂ |
| HO— | S | S | H | H | H | H | —CH₂— | —OH |
| CH₃O— | S | S | H | H | H | H | —CH₂— | —OCH₃ |
| C₂H₅O— | S | S | H | H | H | H | —C₂H₄— | —OC₂H₅ |
| C₃H₇O— | S | S | H | H | H | H | —CH₂— | —OC₃H₇ |
| C₆H₅O— | S | S | H | H | H | H | —CH₂— | —OC₆H₅ |
| CH₃C₆H₄O— | S | S | H | H | H | H | —CH₂— | —OC₆H₄(CH₃) |
| (CH₃)₂C₆H₃O— | S | S | H | H | H | H | —CH₂— | —OC₆H₃(CH₃)₂ |
| HS— | S | S | H | H | H | H | —CH₂— | —SH |
| CH₃S— | S | S | H | H | H | H | —CH₂— | —SCH₃ |
| C₂H₅S— | S | S | H | H | H | H | —C₂H₄— | —SC₂H₅ |
| C₃H₇S— | S | S | H | H | H | H | —CH₂— | —SC₃H₇ |
| C₆H₅S— | S | S | H | H | H | H | —CH₂— | —SC₆H₅ |
| CH₃C₆H₄S— | S | S | H | H | H | H | —CH₂— | —SC₆H₄(CH₃) |
| (CH₃)₂C₆H₃S— | S | S | H | H | H | H | —CH₂— | —SC₆H₃(CH₃)₂ |

Preparation of Improved Dispersant

The selected nitrogen or ester containing reactant A and bis-keto/thioketo reactant B are contacted for a time and under conditions sufficient to react at least a portion of the reactive primary and/or secondary amines on the aminated reactant A (or to react one or more of the hydroxy or ester groups in the ester reactant A) with one or more terminal carbonyl or thiocarbonyl groups of the bis-beta keto/thioketo reactant B. Preferably, the reactant A comprises a nitrogen-containing compound containing at least two reactive amino groups (i.e. secondary or primary amino groups) per molecule, to provide improved chain extension of the ashless dispersant by reaction of the bis-keto/thioketo compound therewith.

Generally, the reaction will be conducted at a temperature of from about 25° to 250° C., preferably from about 100° to 200° C., and most preferably from about 120° to 180° C., the reaction time will generally range from about 1 to 8 hrs., and preferably from about 1 to 4 hrs. The reaction may be conducted at atmospheric, subatmospheric, or super atmospheric pressure, and is preferably conducted in the substantial absence of $O_2$ or air, e.g. under an inert gas blanket (e.g., $N_2$).

The reaction of Reactants A and B may be conducted in a diluent or inert solvent for the reaction. Suitable such diluents and solvents are heptane, toluene, xylene, chlorobenzene and the like.

The reactants may be charged to the reaction zone in any convenient order and manner, and the reaction may be conducted batchwise, continuously or semicontinuously.

The relative moles of the reactants A and B charged can vary widely, and reactant B will generally be used in an amount of from about 0.01 to 1, preferably from about 0.02 to 1, equivalent of ester group per molar equivalent of ester reactive group (alcohol and primary and secondary amine groups) of reactant A.

The reaction of the bis-beta- carbonyl or thiocarbonyl reactants of this invention with the nitrogen- or ester-containing ashless dispersants is a complex one, and the nature of the product will vary, depending on the temperature of the reaction. At temperatures of greater than about 110° C. (e.g. from about 120° to 250° C., or preferably from about 120° to 180° C.), the reaction of the bis-beta-carbonyl or thiocarbonyl reactant and the nitrogen-containing ashless dispersant can be illustrated by the following equation, wherein an aliphatic bis-beta-carbonyl or thiocarbonyl compound of Formula XXVI is reacted with a long-chain hydrocarbyl substituted bis-succinimide:

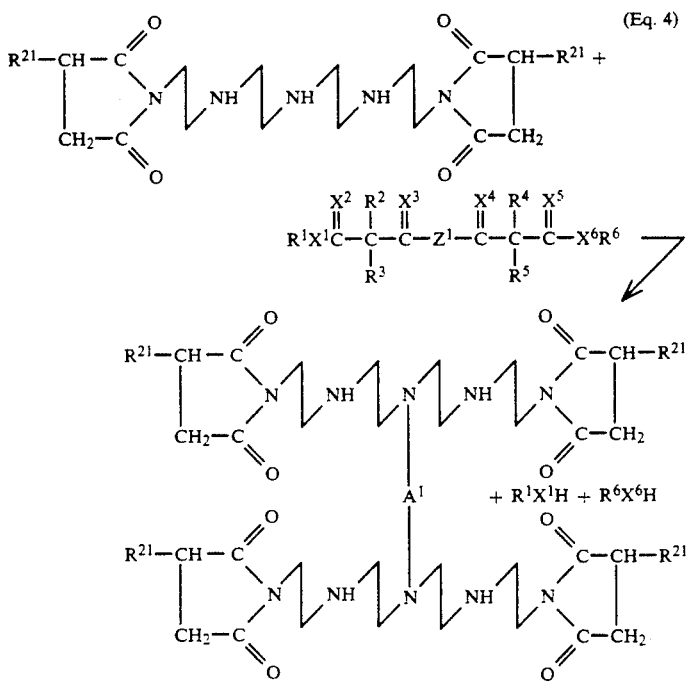

(Eq. 4)

wherein $R^{21}$, $R^1$–$R^6$, $X^1$–$X^6$ and $Z^1$ are as defined above, and wherein the $A^1$ linking group comprises a moiety of the formula

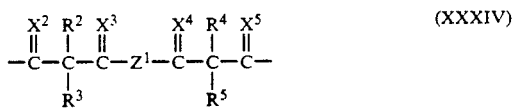

(XXXIV)

wherein $X^2$–$X^5$, $R^2$–$R^5$ and $Z^1$ are as defined above. Preferred such $A^1$ moieties are those wherein $X^2$–$X^5$ are each O, $R^2$–$R^5$ are the same or different and are each H or $C_1$ to $C_4$ alkyl, and $Z^1$ is $C_2$ to $C_6$ alkylene, and particularly preferred are $A^1$ moieties wherein $X^2$–$X^5$ are O, $R^2$–$R^5$ are each H, and $Z^1$ is $C_2$ or $C_3$ alkylene.

The $R^1X^1H$ and $R^6X^6H$ compounds formed in the reaction (e.g. the corresponding alcohols, thiols, etc.) can be removed from the liquid reaction mixture (or their concentration therein reduced), if desired, by conventional means, including stripping the reaction mixture (continuously or intermittently) during or after the reaction with an inert gas (e.g. $N_2$) to remove such volatile compounds.

It will be apparent that the reaction of the reactive nitrogen atoms with the terminal —$C(X^2)$— and —$C(X^5)$— groups of the bis-beta reactant in Equation 4 results in the formation of amide groups (that is,

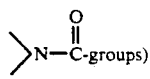

when $X^2$ and $X^5$ are O, and thioamide groups (that is,

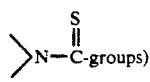

when $X^2$ and $X^5$ are S.

The above reaction illustrates a product adduct in which a single $A^1$ linking group is present. However, more than one $A^1$ moiety can be attached to each reacted nitrogen dispersant molecule, and the average ratio of the number of reacted $A^1$ moieties to the number of nitrogen containing dispersant molecules reacted can vary widely. Moreover, chain linked or comb structures can be formed in which the three or more molecules of nitrogen dispersant are linked by a series of such $A^1$ moieties. Such chain linked structures can be illustrated by the following formula:

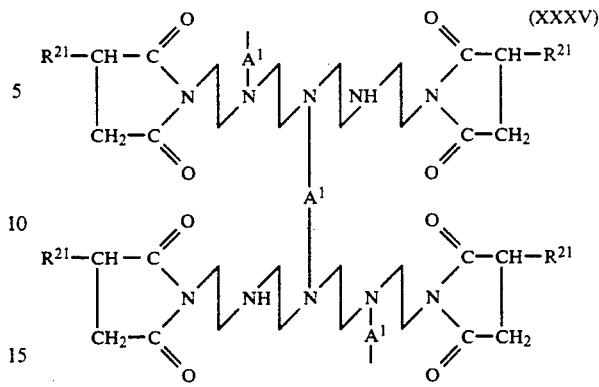

wherein $R^{21}$ and $A^1$ are as defined above.

Similarly, the reaction of a cycloaliphatic bis-beta reactant of Formula II with a long-chain hydrocarbyl substituted Mannich Base nitrogen-containing dispersant can be illustrated as follows (Eq. 5):

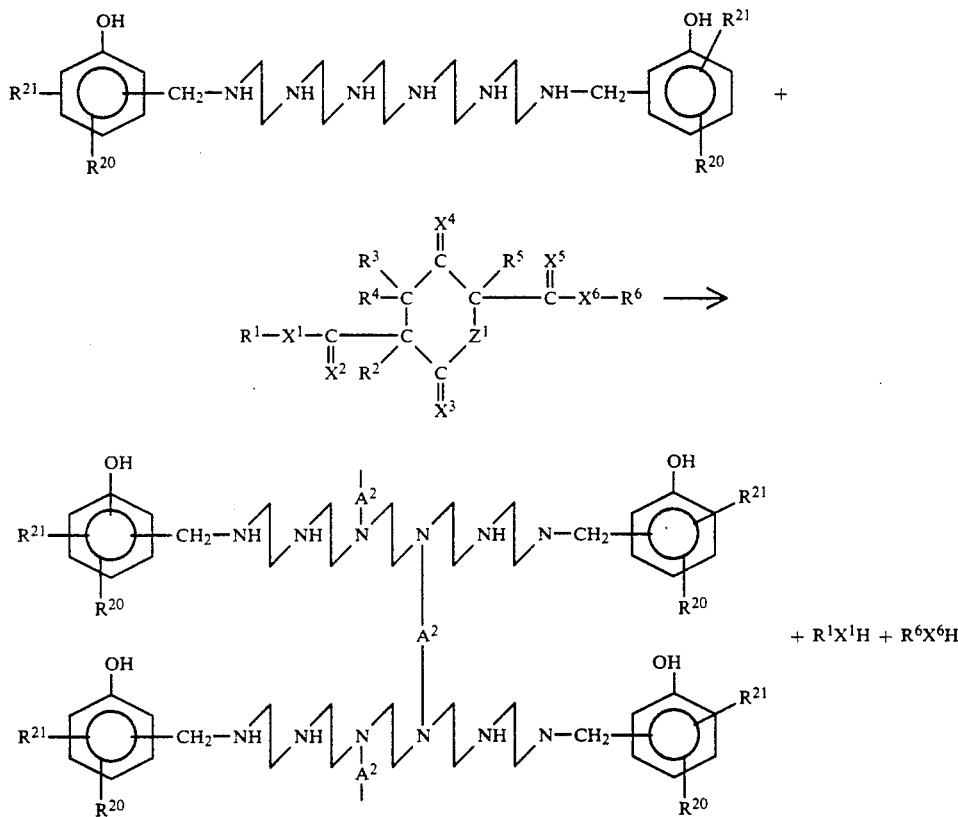

wherein $A^2$ comprises the moiety

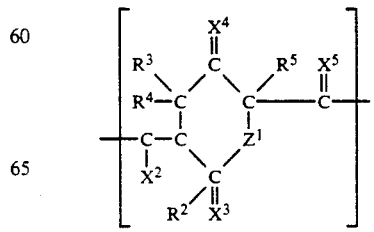

wherein $R^{20}$, $R^{21}$, $R^1$-$R^6$, $X^1$-$X^6$ and $Z^1$ are as defined above. Preferred are moieties $A^2$ wherein $X^2$-$X^5$ are each O, $R^2$ and $R^5$ are each H, $R^3$ and $R^4$ are the same or different and are H or $C_1$ to $C_4$ alkyl, and $Z^1$ is $C_1$-$C_4$ alkylene.

At reaction temperatures of less than about 110° C. (e.g. 0° C. to 110° C.), the reaction of the bis-beta-carbonyl or thiocarbonyl reactant and nitrogen-containing ashless dispersant can be illustrated by the following equation, wherein an aliphatic bis-beta-carbonyl or thiocarbonyl compound of Formula XXVI is reacted with a long-chain substituted bis-succinimide to give bis-enamine adducts as follows:

>N—C($Z^1$)=C< groups)

wherein each double bond is conjugated to a carboxy or thiocarboxy group, —C($X^2$)— or —C($X^5$)—.

The above reaction illustrates a product adduct in which a single $L^1$ linking group is present. However, more than one $L^1$ moiety can be attached to each reacted nitrogen dispersant molecule, and the average ratio of the number of reacted $L^1$ moieties to the number of nitrogen containing dispersant molecules reacted can vary widely. Moreover, chain linked or comb structures can be formed in which the three or more molecules of nitrogen dispersant are linked by a series of

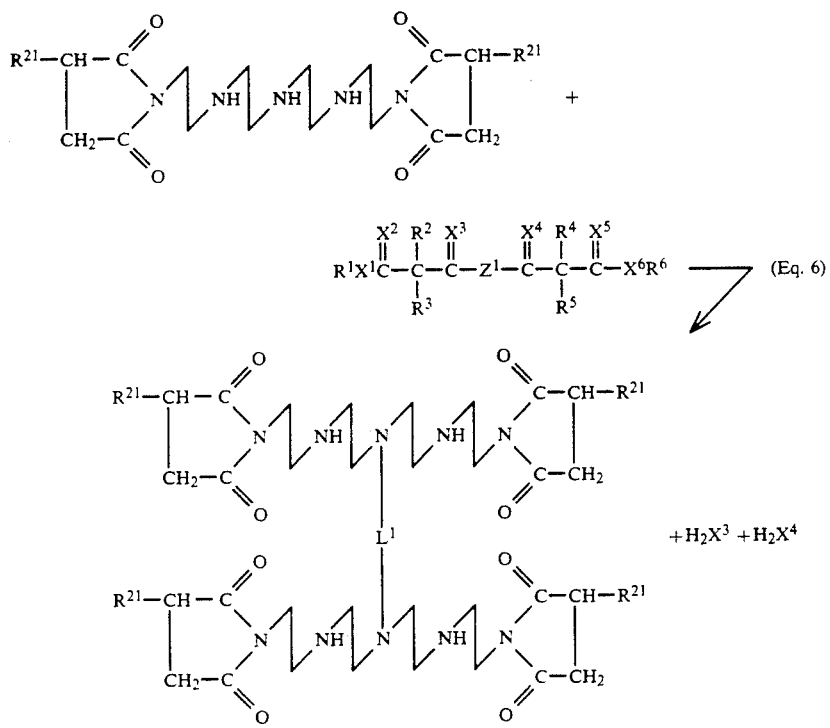

(Eq. 6)

wherein $R^{21}$, $R^2$ and $R^4$ are hydrogen, $R^1$, $R^3$, $R^5$, $R^6$, $X^1$-$X^6$ and $Z^1$ are as defined above, and wherein the $L^1$ linking group comprises a moiety of the formula

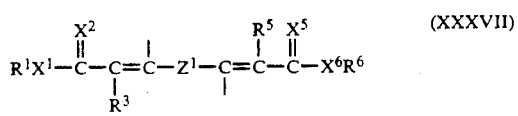

(XXXVII)

wherein $X^1$, $X^2$, $X^5$, $X^6$, $R^1$, $R^3$, $R^5$, $R^6$ and $Z^1$ are as defined above. Preferably $X^1$-$X^6$ are each O, are $R^2$ and $R^4$ are hydrogen, $R^1$, $R^3$, $R^5$ and $R^6$ are the same or different and are each H or $C_1$ to $C_4$ alkyl, and $Z^1$ is $C_2$ to $C_6$ alkylene, and particularly preferred are $L^1$ moieties derived from Formula XXVI compounds wherein $X^1$-$X^6$ are O, $R^1$-$R^6$ are each H, and $Z^1$ is $C_2$ or $C_3$ alkylene.

It will be apparent that the reaction of the reactive nitrogen atoms with the non-terminal —C($X^3$)— and —C($X^4$)— groups of the bis-beta reactant in Equation 6 results in the formation of enamine groups (that is, such $L^1$ moieties. Such chain linked structures can be illustrated by the following formula:

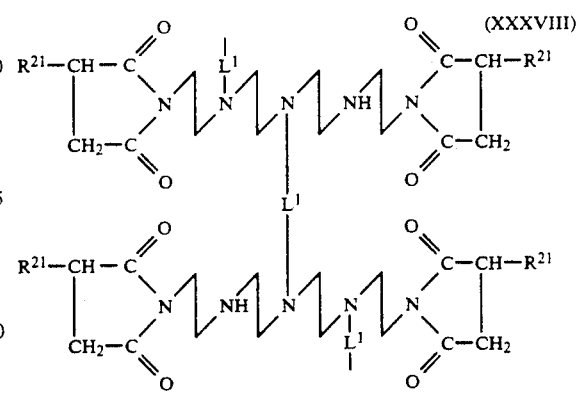

wherein $R^{21}$ and $L^1$ are as defined above.

Similarly, the reaction of a cycloaliphatic bis-beta reactant of Formula II with a long-chain hydrocarbyl substituted Mannich Base nitrogen-containing dispersant can be illustrated as follows (Eq. 7):

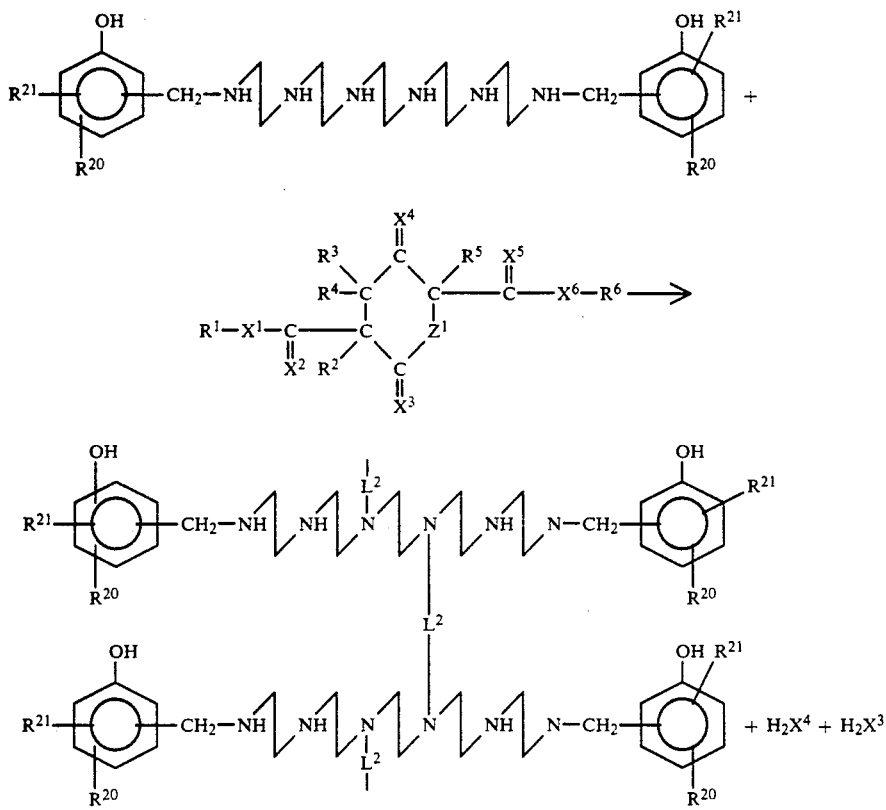

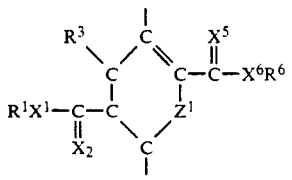

wherein L² comprises the moiety (XXXIX)

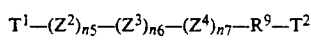

wherein $R^{20}$, $R^{21}$, $R^1$-$R^6$, $X^1$-$X^6$ and $Z^1$ are as defined above with respect to Formula XXXVII. Preferred are L² moieties derived from Formula XXVII compounds wherin $X^1$-$X^6$ are each O, $R^2$ and $R^5$ are each H, $R^3$ and $R^4$ are the same or different and are H or $C_1$ to $C_4$ alkyl, and $Z^1$ is $C_1$-$C_4$ alkylene.

$$T^1—(Z^2)_{n5}—(Z^3)_{n6}—(Z^4)_{n7}—R^9—T^2 \quad \text{(XL)}$$

$T^1$ is a moiety of the formula:

(XLI)

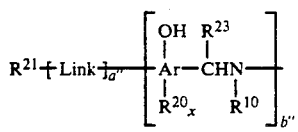

wherein $R^{21}$ is long chain hydrocarbyl of a polyolefin as defined above (e.g. polyolefin having a number average molecular weight of from about 700 to about 3,500), Ar is aryl of 6 to 10 ring carbon atoms, $R^{20}$ is $C_1$ to $C_6$ alkyl, $R^{23}$ is H or $C_1$ to $C_4$ alkyl, $R^{10}$ is H or $C_1$ to $C_{20}$ hydrocarbyl, a" and b" are the same or different and are each 0 or 1, x is 0, 1 or 2, and "Link" comprises a member selected from the group consisting of $$-C_pH_{2p}-\overset{O}{\underset{}{C}}-\underset{R^8}{N}-, \quad \text{(XLII)}$$

(XLIII)

(LIV)

wherein "p" is an integer of from 2 to 9, R" is H or $C_1$ to $C_{20}$ hydrocarbyl, $R^8$, $R^{12}$, $R^{13}$, $R^{14}$, $R^{15}$, and $R^{16}$ are the same or different and are H or $C_1$ to $C_6$ alkyl, and $Z^5$ is $C_1$ to $C_4$ alkylene; $Z^2$ and $Z^4$ are the same or different and are moieties of the formula:

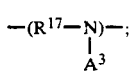

$Z^3$ is a moiety of the formula:

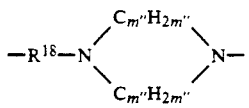

wherein $R^9$, $R^{17}$ and $R^{18}$ are the same or different and are alkylene of from 1 to 6 carbon atoms, m" is an integer of from 1 to 5, each $A^3$ is independently selected from the group consisting of H, $A^1$, $A^2$, $L^1$, $L^2$ and the moiety:

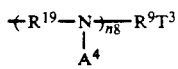

wherein $A^4$ is H, $A^1$, $A^2$, $L^1$ or $L^2$, $R^9$ is as defined above, $R^{19}$ is alkylene of from 1 to 6 carbon atoms, $T^2$ and $T^3$ are the same or different and each comprises $T^1$ or a member selected from the group consisting of moieties of the formula:

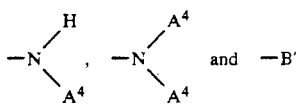

wherein $A^4$ is as defined above, and B' is substituted or unsubstituted alkyl or aryl-containing group, $n_5$, $n_6$, $n_7$ and $n_8$ are the same or different and are each an integer of from 0 to 10, with the provisos that the sum of $n^5$, $n^6$, $n^7$ and $n^8$ is from 3 to 10 and the sum of $n^1$ and $n^3$ is at least 1, and wherein $A^1$ comprises at least one moiety of the formula:

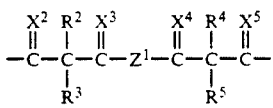

$A^2$ comprises at least one moiety of the formula:

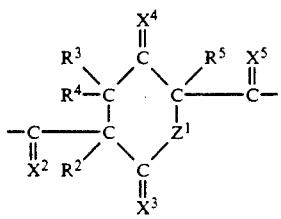

$L^1$ comprises at least one moiety of the formula

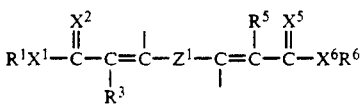

and $L^2$ comprises at least one moiety of the formula

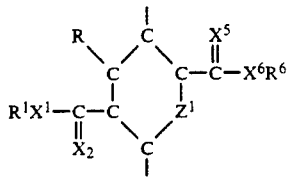

wherein, $R^2$-$R^5$, $X^2$-$X^5$, and $Z^1$ are as defined above, with the provisos that (1) when $A^3$ or $A^4$ is $L^1$ or $L^2$, $R^2$ and $R^4$ are each H, and (2) said adduct contains at least one $A^1$, $A^2$, $L^1$ or $L^2$ moiety. Preferred adducts are those containing $A^1$ moieties wherein $X^2$-$X^5$ are each O, $R^2$ and $R^5$ are each H, $R^3$ and $R^4$ are the same or different and are H or $C_1$ to $C_4$ alkyl, and $Z^1$ is $C_1$-$C_4$ alkylene.

In accordance with another embodiment of the present invention, the amine compound (e.g. polyamine, as described above) can be reacted in a first step with a bis-keo/thioketo compound, employing conditions as described above for reaction of the latter with the nitrogen-containing ashless dispersants. The cross-linked intermediate adduct so formed, containing at least one $A^1$, $A^2$, $L^1$ or $L^2$ linking reactant, as described above, can then be reacted in a second step either (1) with the selected long-chain hydrocarbyl substituted mono- or dicarboxylic acid, anhydride or ester material (i.e. as used in forming reactant A-1, as described above), (2) in a Mannich Base reaction with an aldehyde (e.g. formaldehyde) and a long-chain hydrocarbyl substituted hydroxy-aromatic compound (e.g. as described above in forming reactant A-3), or (3) in a Mannich Base reaction with an aldehyde (e.g. formaldehyde) and an intermediate adduct formed by reacting a long-chain hydrocarbyl substituted mono- or dicarboxylic acid, anhydride or ester with an aminophenol (e.g. as described above in forming reactant A-4). The first stage reaction can be illustrated by the following equation (Eq. 8):

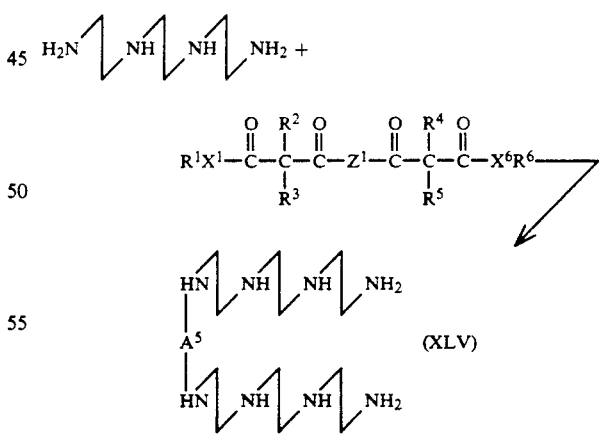

(XLV)

wherein $A^5$ is $A^1$, $A^2$, $L^1$ or $L^2$, are defined above. As described above, the temperature of the first stage reaction will determine whether or not the $A^5$ linking groups are of an amide character ($A^1$ or $A^2$) or an enamine character ($L^1$ or $L^2$). Generally, the bis-keto/thioketo reactant will be employed in an amount of from about 0.02 to 0.8 equivalents of keto (or thioketo) moiety content per molar equivalent of primary and secondary amine groups in the amine reactant. The coupled adduct so formed will preferably contain at least two reactive (primary or secondary) amino groups, per molecule.

The dispersant adducts of this invention can then be formed by reacting, in a second step, the above intermediate amine adduct with, e.g. a long-chain hydrocarbyl substituted dicarboxylic anhydrive (such as polyisobutenyl substituted succinic anhydride), which can be illustrated by the following equation (Eq. 9):

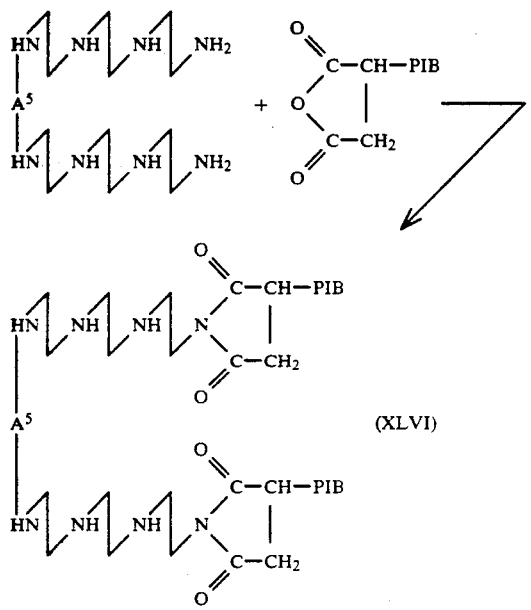

(XLVI)

wherein $A^5$ is as defined above and "PIB" is a polyisobutenyl group.

If desired, the dispersants of this invention, prepared as described above, can be contacted in an additional step with additional polyamine, preferably a polyamine having from about 1 to 15 carbon atoms and from about 1 to 12 amine groups per molecule, and more preferably from about 1 to 4 carbon atoms and from about 1 to 3 amine groups per molecule, and having at least two reactive amine groups, i.e. primary or secondary nitrogen atoms. Non-limiting examples of suitable amine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di-(1,2-propylene)triamine; di-(1,3-propylene) triamine; N,N-dimethyl-1,3-diaminopropane; N,N-di-(2-aminoethyl) ethylene diamine; N,N-di(2-hydroxyethyl)-1,3-propylene diamine; 3-dodecyloxypropylamine; N-dodecyl-1,3-propane diamine; tris hydroxymethylaminomethane (THAM); diisopropanol amine: diethanol amine; triethanol amine; mono-, di-, and tri-tallow amines; amino morpholines such as N-(3-aminopropyl)morpholine; and mixtures thereof.

Further aspects of the present invention reside in the formation of metal complexes and other post-treatment derivatives, e.g., borated derivatives, of the novel additives prepared in accordance with this invention. Suitable metal complexes may be formed in accordance with known techniques of employing a reactive metal ion species during or after the formation of the present dispersant materials. Complex-forming metal reactants include the nitrates, thiocyanates, halides, carboxylates, phosphates, thio-phosphates, sulfates, and borates of transition metals such as iron, cobalt, nickel, copper, chromium, manganese, molybdenum, tungsten, ruthenium, palladium, platinum, cadmium, lead, silver, mercury, antimony and the like. Prior art disclosures of these complexing reactions may be found in U.S. Pat. Nos. 3,306,908 and Re. 26,443.

Post-treatment compositions include those formed by reacting the novel additives of the present invention with one or more post-treating reagents, usually selected from the group consisting of boron oxide, boron oxide hydrate, boron halides, boron acids, sulfur, sulfur chlorides, phosphorous sulfides and oxides, carboxylic acid or anhydride acylating agents, epoxides and episulfides and acrylonitriles. The reaction of such post-treating agents with the novel additives of this invention is carried out using procedures known in the art. For example, boration may be accomplished in accordance with the teachings of U.S. Pat. No. 3,254,025 by treating the additive compound of the present invention with a boron oxide, halide, ester or acid. Treatment may be carried out by adding about 1-3 wt. % of the boron compound, preferably boric acid, and heating and stirring the reaction mixture at about 135° C. to 165° C. for to 5 hours followed by nitrogen stripping and filtration, if desired. Mineral oil or inert organic solvents facilitate the process.

The compositions produced in accordance with the present invention have been found to be particularly useful as fuel and lubricating oil additives.

When the compositions of this invention are used in normally liquid petroleum fuels, such as middle distillates boiling from about 65 to 430° C. including kerosene, diesel fuels, home heating fuel oil, jet fuels, etc., a concentration of the additive in the fuel in the range of typically from 0.001 wt. % to 0.5 wt. %, preferably 0.005 wt. % to 0.2 wt. %, based on the total weight of the composition, will usually be employed. These additives can contribute fuel stability as well as dispersant activity and/or varnish control behavior to the fuel.

The compounds of this invention find their primary utility, however, in lubricating oil compositions, which employ a base oil in which the additives are dissolved or dispersed. Such base oils may be natural or synthetic.

Thus, base oils suitable for use in preparing the lubricating compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additives of the present invention in base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

Thus, the additives of the present invention may be suitably incorporated into synthetic base oils such as alkyl esters of dicarboxylic acids, polyglycols and alcohols; polyalpha-olefins, polybutenes, alkyl benzenes, organic esters of phosphoric acids, polysilicone oils, etc.

selected type of lubricating oil composition can be included as desired.

The additives of this invention are oil-soluble, dissolvable in oil with the aid of a suitable solvent, or are stably dispersible materials. Oil-soluble, dissolvable, or stably dispersible as that terminology is used herein does not necessarily indicate that the materials are soluble, dissolvable, miscible, or capable of being suspended in oil in all proportions. It does mean, however, that the additives, for instance, are soluble or stably dispersible in oil to an extent sufficient to exert their intended effect in the environment in which the oil is employed. Moreover, the additional incorporation of other additives may also permit incorporation of higher levels of a particular polymer adduct hereof, if desired.

Accordingly, while any dispersant effective amount of these additives can be incorporated into the fully formulated lubricating oil composition, it is contemplated that such effective amount be sufficient to provide said lube oil composition with an amount of the additive of typically from 0.01 to about 10, e g., 0.1 to 6.0, and preferably from 0.25 to 3.0 wt. %, based on the weight of said composition.

The additives of the present invention can be incorporated into the lubricating oil in any convenient way. Thus, they can be added directly to the oil by dispersing, or dissolving the same in the oil at the desired level of concentration, typically with the aid of a suitable solvent such as toluene, cyclohexane, or tetrahydrofuran. Such blending can occur at room temperature or elevated.

Natural base oils include mineral lubricating oils which may vary widely as to their crude source, e.g., whether paraffinic, naphthenic, mixed, paraffinicnaphthenic, and the like; as well as to their formation, e.g., distillation range, straight run or cracked, hydrofined, solvent extracted and the like.

More specifically, the natural lubricating oil base stocks which can be used in the compositions of this invention may be straight mineral lubricating oil or distillates derived from paraffinic, naphthenic, asphaltic, or mixed base crudes, or, if desired, various blends oils may be employed as well as residuals, particularly those from which asphaltic constituents have been removed. The oils may be refined by conventional methods using acid, alkali, and/or clay or other agents such as aluminum chloride, or they may be extracted oils produced, for example, by solvent extraction with solvents of the type of phenol, sulfur dioxide, furfural, dichlorodiethyl ether, nitrobenzene, crotonaldehyde, etc.

The lubricating oil base stock conveniently has a viscosity of typically about 2.5 to about 12, and preferably about 2.5 to about 9 cSt. at 100° C.

Thus, the additives of the present invention can be employed in a lubricating oil composition which comprises lubricating oil, typically in a major amount, and the additive, typically in a minor amount, which is effective to impart enhanced dispersancy relative to the absence of the additive. Additional conventional additives selected to meet the particular requirements of a temperatures. In this form the additive per se is thus being utilized as a 100% active ingredient form which can be added to the oil or fuel formulation by the purchaser. Alternatively, these additives may be blended with suitable oil-soluble solvent and base oil to form concentrate, which may then be blended with a lubricating oil base stock to obtain the final formulation.

Concentrates will typically contain from about 2 to 80 wt. %, by weight of the additive, and preferably from about 5 to 40% by weight of the additive.

The lubricating oil base stock for the additive of the present invention typically is adapted to perform selected function by the incorporation of additives therein to form lubricating oil compositions (i.e., formulations).

Representative additives typically present in such formulations include viscosity modifiers, corrosion inhibitors, oxidation inhibitors, friction modifiers, other dispersants, anti-foaming agents, anti-wear agents, pour point depressants, detergents, rust inhibitors and the like.

Viscosity modifiers impart high and low temperature operability to the lubricating oil and permit it to remain shear stable at elevated temperatures and also exhibit acceptable viscosity or fluidity at low temperatures. These viscosity modifiers are generally high molecular weight hydrocarbon polymers including polyesters. The viscosity modifiers may also be derivatized to include other properties or functions, such as the addition of dispersancy properties.

These oil soluble viscosity modifying polymers will generally have weight average molecular weights of from about 10,000 to 1,000,000, preferably 20,000 to 500,000, as determined by gel permeation chromatography or light scattering methods.

Representative examples of suitable viscosity modifiers are any of the types known to the art including polyisobutylene, copolymers of ethylene and propylene, polymethacrylates, methacrylate copolymers, copolymers of an unsaturated dicarboxylic acid and vinyl compound, interpolymers of styrene and acrylic esters, and partially hydrogenated copolymers of styrene/isoprene, styrene/butadiene, and isoprene/butadiene, as well as the partially hydrogenated homopolymers of butadiene and isoprene.

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 wt. % of a sulfide of phosphorus for $\frac{1}{2}$ to 15 hours, at temperature in the range of about 66 to about 316° C. Neutralization of the phosphosulfurized hydrocarbon may be effected in the manner taught in U.S. Pat. No. 1,969,324.

Oxidation inhibitors, or antioxidants, reduce the tendency of mineral oils to deteriorate in service which deterioration can be evidenced by the products of oxidation such as sludge and varnish-like deposits on the metal surfaces, and by viscosity growth. Such oxidation inhibitors include alkaline earth metal salts of alkylphenolthioesters having preferably $C_5$ to $C_{12}$ alkyl side chains, e.g., calcium nonylphenol sulfide, barium toctylphenyl sulfide, dioctylphenylamine, phenylalphanaphthylamine, phospho-sulfurized or sulfurized hydrocarbons, etc.

Other oxidation inhibitors or antioxidants useful in this invention comprise oil-soluble copper compounds. The copper may be blended into the oil as any suitable oil soluble copper compound. By oil soluble it is meant that the compound is oil soluble under normal blending conditions in the oil or additive package. The copper compound may be in the cuprous or cupric form. The copper may be in the form of the copper dihydrocarbyl thio- or dithio-phosphates. Alternatively, the copper may be added as the copper salt of a synthetic or natural carboxylic acid. Examples of same thus include $C_{10}$ to $C_{18}$ fatty acids, such as stearic or palmitic acid, but unsaturated acids such as oleic or branched carboxylic acids such as napthenic acids of molecular weights of from about 200 to 500, or synthetic carboxylic acids, are preferred, because of the improved handling and solubility properties of the resulting copper carboxylates. Also useful are oil-soluble copper dithiocarbamates of the general formula $(R^{30}R^{31},NCSS)zCu$ (where z is 1 or 2, and $R^{30}$ and $R^{31}$, are the same or different hydrocarbyl radicals containing from 1 to 18, and preferably 2 to 12, carbon atoms, and including radicals such as alkyl, alkenyl, aryl, aralkyl, alkaryl and cycloaliphatic radicals. Particularly preferred as $R^{30}$ and $R^{31}$, groups are alkyl groups of from 2 to 8 carbon atoms. Thus, the radicals may, for example, be ethyl, n-propyl, i-propyl, n-butyl, i-butyl, sec-butyl, amyl, n-hexyl, i-hexyl, n-heptyl, n-octyl, decyl, dodecyl, octadecyl, 2-ethylhexyl, phenyl, butylphenyl, cyclohexyl, methylcyclopentyl, propenyl, butenyl, etc. In order to obtain oil solubility, the total number of carbon atoms (i.e., $R^{30}$ and $R^{31}$,) will generally be about 5 or greater. Copper sulphonates, phenates, and acetylacetonates may also be used.

Exemplary of useful copper compounds are copper $Cu^I$ and/or $Cu^{II}$ salts of alkenyl succinic acids or anhydrides. The salts themselves may be basic, neutral or acidic. They may be formed by reacting (a) polyalkylene succinimides (having polymer groups of Mn of 700 to 5,000) derived from polyalkylene-polyamines, which have at least one free carboxylic acid group, with (b) a reactive metal compound. Suitable reactive metal compounds include those such as cupric or cuprous hydroxides, oxides, acetates, borates, and carbonates or basic copper carbonate.

Examples of these metal salts are Cu salts of polyisobutenyl succinic anhydride, and Cu salts of polyisobutenyl succinic acid. Preferably, the selected metal employed is its divalent form, e.g., $Cu+2$. The preferred substrates are polyalkenyl succinic acids in which the alkenyl group has a molecular weight greater than about 700. The alkenyl group desirably has a Mn from about 900 to 1,400, and up to 2,500, with a Mn of about 950 being most preferred. Especially preferred is polyisobutylene succinic anhydride or acid. These materials may desirably be dissolved in a solvent, such as a mineral oil, and heated in the presence of a water solution (or slurry) of the metal bearing material. Heating may take place between 70° C. and about 200° C. Temperatures of 100° C. to 140° C. are entirely adequate. It may be necessary, depending upon the salt produced, not to allow the reaction to remain at a temperature above about 140° C. for an extended period of time, e.g., longer than 5 hours, or decomposition of the salt may occur.

The copper antioxidants (e.g., Cu-polyisobutenyl succinic anhydride, Cu-oleate, or mixtures thereof) will be generally employed in an amount of from about 50 to 500 ppm by weight of the metal, in the final lubricating or fuel composition.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxyalkylene hydrocarbyl succinimide, S-carboxyalkylene hydrocarbyl succinamic acid and mixtures thereof; U.S. Pat. No. 3,879,306 which discloses N(hydroxyalkyl) alkenyl succinimic acids or succinimides: U.S. Pat. No. 3,932,290 which discloses reaction products of di- (lower alkyl) phosphites and epoxides; and U.S. Pat. No. 4,028,258 which discloses the alkylene oxide adduct of phosphosulfurized N-(hydroxyalkyl) alkenyl succinimides. The disclosures of the above references are herein incorporated by reference. The most preferred friction modifiers are succinate esters, or metal salts thereof, of hydrocarbyl substituted succinic acids or anhydrides and thiobisalkanols such as described in U.S. Pat. No. 4,344,853.

Dispersants maintain oil insolubles, resulting from oxidation during use, in suspension in the fluid thus preventing sludge flocculation and precipitation or deposition on metal parts. Suitable dispersants include high molecular weight alkyl succinimides, the reaction product of oil-soluble polyisobutylene succinic anhydride with ethylene amines such as tetraethylene pentamine and borated salts thereof.

Pour point depressants, otherwise known as lube oil flow improvers, lower the temperature at which the fluid will flow or can be poured. Such additives are well known. Typically of those additives which usefully optimize the low temperature fluidity of the fluid are C8-C18 dialkylfumarate vinyl acetate copolymers, polymethacrylates, and wax naphthalene. Foam control can be provided by an antifoamant of the polysiloxane type, e.g., silicone oil and polydimethyl siloxane.

Anti-wear agents, as their name implies, reduce wear of metal parts. Representatives of conventional antiwear agents are zinc dialkyldithiophosphate and zinc diaryldithiosphate.

Detergents and metal rust inhibitors include the metal salts of sulphonic acids, alkyl phenols, sulfurized alkyl phenols, alkyl salicylates, naphthenates and other oil soluble mono- and di-carboxylic acids. Highly basic (viz. overbased) metal sales, such as highly basic alkaline earth metal sulfonates (especially Ca and Mg salts) are frequently used as detergents. Representative examples of such materials, and their methods of preparation, are found in U.S. Pat. No. 4,797,219, the disclosure of which is hereby incorporated by reference.

Some of these numerous additives can provide a multiplicity of effects, e.g., a dispersant-oxidation inhibitor. This approach is well known and need not be further elaborated herein.

Compositions when containing these conventional additives are typically blended into the base oil in amounts which are effective to provide their normal attendant function. Representative effective amounts of such additives are illustrated as follows:

| Additive | Wt. % a.i. (Broad) | Wt. % a.i. (Preferred) |
|---|---|---|
| Viscosity Modifier | 0.01–12 | 0.01–4 |
| Corrosion Inhibitor | 0.01–5 | 0.01–1.5 |
| Oxidation Inhibitor | 0.01–5 | 0.01–1.5 |
| Dispersant | 0.1–20 | 0.1–8 |
| Pour Point Depressant | 0.01–5 | 0.01–1.5 |
| Anti-Foaming Agents | 0.001–3 | 0.001–0.15 |
| Anti-Wear Agents | 0.001–5 | 0.001–1.5 |
| Friction Modifiers | 0.01–5 | 0.01–1.5 |
| Detergents/Rust Inhibitors | 0.01–10 | 0.01–3 |
| Mineral Oil Base | Balance | Balance |

When other additives are employed it may be desirable, although not necessary, to prepare additive concentrates comprising concentrated solutions or dispersions of the dispersant (in concentrate amounts hereinabove described), together with one or more of said other additives (said concentrate when constituting an additive mixture being referred to herein as an additive package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the dispersant additive and optional additional additives in proper amounts to provide the desired concentration in the final formulation when the additive-package is combined with a predetermined amount of base lubricant. Thus, the products of the present invention can be added to small amounts of base oil or other compatible solvents along with other desirable additives to form additive-packages containing active ingredients in collective amounts of typically from about 2.5 to about 90%, and preferably from about 5 to about 75%, and most preferably from about 8 to about 50% by weight additives in the appropriate proportions with the remainder being base oil.

All of said weight percents expressed herein are based on active ingredient (a.i.) content of the additive, and/or upon the total weight of any additive-package, or formulation which will be the sum of the a.i. weight of each additive plus the weight of total oil or diluent.

This invention will be further understood by reference to the following examples, wherein all parts are parts by weight and all molecular weights are number weight average molecular weights as noted, and which include preferred embodiments of the invention.

EXAMPLE 1

Preparation of Polyisobutylene Succinic Anhydride

A polyisobutenyl succinic anhydride (PIBSA) is prepared by heating a mixture of polyisobutylene (PIB)(about 2,000 $M_n$; $\overline{M}_w/\overline{M}_n \approx 2.5$) with maleic anhydride to a temperature of about 220° C. When the temperature reaches 120° C., the chlorine is added to the hot mixture for about 5.5 hours. The reaction mixture is then heat soaked at 220° C. for about 1.5 hours and then stripped with nitrogen for about one hour. The resulting polyisobutenyl succinic anhydride has an ASTM Saponification Number of about 54. The PIBSA product is 80 wt. % active ingredient (A.I.), the remainder being primarily unfunctionalized PIB.

EXAMPLE 2

Preparation of PIBSA-PAM Dispersant

A mixture of 100 parts of the PIBSA starting material of Example 1, and 60 parts of mineral oil is heated to 150° C. Then 5 parts of a commercially available polyalkylene polyamine comprising a polyethylene polyamine (having an average of about 6 nitrogen atoms and an average of about 6 carbon atoms per molecule) are added dropwise while stirring. The mixture is nitrogen stripped at 150° C. for 1 hour and then filtered to provide the polyisobutenyl succinimide product (PIBSA-PAM). The oil solution is found to contain 1 wt. % nitrogen.

EXAMPLE 3

Preparation of Bis-beta-Keto Ester Modified PIBSA-PAM

A 300 parts portion of the PIBSA-PAM product of Example 2 and 12.8 parts of diethyl sucinnyl succinate are admixed and heated to 150° C. for 4 hours, with continuous stirring under an air-cooled condenser. The condenser is then removed and the product sparged with $N_2$ for 1 hr. The resulting oil solution has a viscosity of 4,423 cSt at 100° C.

EXAMPLE 4

Preparation of Bis-beta-Keto Ester Modified PIBSA-PAM

A 300 parts portion of the PIBSA-PAM product of Example 2 and 25.6 parts of diethyl sucinnyl succinate are admixed and heated to 150° C. for 4 hours, with continuous stirring under an air-cooled condenser. The condenser is then removed and the product sparged with $N_2$ for 1 hr. The resulting oil solution has a viscosity of 3,702 cSt at 100° C.

The following lubricating oil compositions are prepared using the dispersants of Examples 3–4, and unmodified dispersant of Example 2. The resulting compositions are then tested for sludge inhibition (via the SIB test) and varnish inhibition (via the VIB test), as described below.

The SIB test has been found, after a large number of evaluations, to be an excellent test for assessing the dispersing power of lubricating oil dispersant additives.

The medium chosen for the SIB test is a used crankcase mineral lubricating oil composition having an original viscosity of about 325 SUS at 38° C. that has been used in a taxicab that was driven generally for short trips only, thereby causing a buildup of a high concentration of sludge precursors. The oil that is used contains only a refined base mineral lubricating oil, a viscosity index improver, a pour point depressant and zinc dialkyldithiophosphate anti-wear additive. The oil contains no sludge dispersant. A quantity of such used oil is acquired by draining and refilling the taxicab crankcase at 1,000–2,000 mile intervals.

The SIB test is conducted in the following manner: the aforesaid used crankcase oil, which is milky brown in color, is freed of sludge by centrifuging for one hour at about 39,000 gravities (gs.). The resulting clear bright red supernatant oil is then decanted from the insoluble sludge particles thereby separated out. However, the supernatant oil still contains oil-soluble sludge precursors which on heating under the conditions employed by this test will tend to form additional oil-insoluble deposits of sludge. The sludge inhibiting properties of the additives being tested are determined by adding to portions of the supernatant used oil, a small amount, such as 0.5, or 2 weight percent, of the particular additive being tested. Ten grams of each blend being tested are placed in a stainless steel centrifuge tube and are heated at 135° C. for 16 hours in the presence of air. Following the heating, the tube containing the oil being tested is cooled and then centrifuged for about 30 minutes at room temperature at about 39,000 gs. Any deposits of new sludge that form in this step are separated from the oil by decanting the supernatant oil and then carefully washing the sludge deposits with 25 ml of heptane to remove all remaining oil from the sludge and further centrifuging. The weight of the new solid sludge that has been formed in the test, in milligrams, is determined by drying the residue and weighing it. The results are reported as amount of precipitated sludge in comparison with the precipitated sludge of a blank not containing any additional additive, which blank is normalized to a rating of 10. The less new sludge precipitated in the presence of the additive, the lower the SIB value and the more effective is the additive as a sludge dispersant. In other words, if the additive gives half as much precipitated sludge as the blank, then it would be rated 5.0 since the blank will be normalized to 10.

The VIB test is used to determine varnish inhibition. Here, each test sample consists of 10 grams of lubricating oil containing a small amount of the additive being tested. The test oil to which the additive is admixed is of the same type as used in the above-described SIB test. Each ten gram sample is heat soaked overnight at about 140° C. and is thereafter centrifuged to remove the sludge. The supernatant fluid of each sample is subjected to heat cycling from about 150° C. to room temperature over a period of 3.5 hours at a frequency of about 2 cycles per minute. During the heating phase, gas which is a mixture of about 0.7 volume percent $SO_2$, 1.4 volume percent NO and balance air is bubbled through the test samples. During the cooling phase, water vapor is bubbled through the test samples. At the end of the test period, which testing cycle can be repeated as necessary to determine the inhibiting effect of any additive, the wall surfaces of the test flasks in which the samples were contained are visually evaluated as to the varnish inhibition. The amount of varnish imposed on the walls is rated to values of from 1 to 11 with the higher number being the greater amount of varnish, in comparison with a blank with no additive that was rated 11.

10.00 grams of SIB test oil were mixed with 0.05 grams of the products of the Examples 2-4 and tested in the aforedescribed SIB and VIB tests.

The test results are summarized below in Table V. The compounds of this invention, Examples 3 and 4, clearly show the higher viscosities and superior sludge and varnish handling characteristics relative to the PIB-SA-PAM dispersant (Ex. 1) which was not subsequently modified with diethyl sucinnyl succinate.

TABLE V

| Dispersant | Viscosity (1) | SIB | VIB |
|---|---|---|---|
| Comp. Ex. 2 | 961 | 5.77 | 3 |
| Ex. 3 | 4,423 | 5.11 | 2 |
| Ex. 4 | 3,702 | 4.74 | 3 |

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A borated adduct useful as a dispersant additive to oleaginous compositions comprising the reaction products of:
   (A) at least one ashless dispersant which comprises oil soluble salts, amides, imides, or mixtures thereof, of long chain hydrocarbyl substituted mono- and dicarboxylic acids their anhydrides or esters; and
   (B) at least one bis-(keto/thioketo ester/thioester) compound; wherein the reaction product is borated.

2. The dispersant adduct according to claim 1 wherein said ashless dispersant comprises the nitrogen-containing reaction product of (a) at least one member selected from the group consisting of long chain hydrocarbyl polymers substituted with at least one of $C_4$ to $C_{10}$ monounsaturated dicarboxylic acid producing moieties and $C_3$ to $C_{10}$ monounsaturated monocarboxylic acid producing moieties, said substituted polymer formed by reacting an olefin polymer of $C_2$ to $C_{10}$ monoolefin having a number average molecular weight of about 700 to 5,000 and a monounsaturated carboxylic reactant comprising at least one member selected from the group consisting of (i) monounsaturated $C_4$ to $C_{10}$ dicarboxylic acids wherein (a) the carboxyl groups are located on adjacent carbon atoms and (b) at least one of said adjacent carbon atoms are part of said monounsaturation; (ii) anhydride and $C_1$ to $C_5$ alcohol derived mono- or di-ester derivatives of (i); (iii) monounsaturated $C_3$ to $C_{10}$ monocarboxylic acids wherein the carbon-carbon double bond is conjugated to the carboxy group; and (iv) $C_1$ to $C_5$ alcohol derived monoester derivatives of (iii); and (b) at least one polyamine.

3. The dispersant adduct according to claim 1 wherein the bis-(keto/thioketo ester/thioester) compound comprises at least one bis-(beta-keto/thioketo ester/thioester) compound of the formula

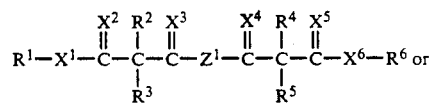

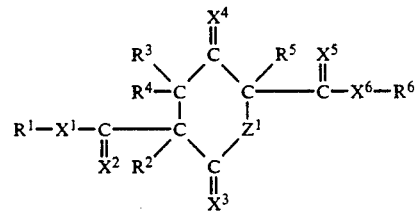

wherein $R^1$, $R^2$, $R^3$, $R^4$, $R^5$ and $R^6$ are independently selected from the group consisting of H and substituted or unsubstituted hydrocarbyl, $Z^1$ is divalent hydrocarbyl, which can be substituted or unsubstituted, and $X^1$, $X^2$, $X^3$, $X^4$, $X^5$, and $X^6$ are the same or different and are O or S.

4. The dispersant adduct according to claim 3 wherein $X^3$ and $X^4$ are each O and at least one of $X^1$, $X^2$, $X^5$ and $X^6$ is O.

5. The dispersant adduct according to claim 3 wherein $X^3$ and $X^4$ are each O and at least one of $X^1$, $X^2$, $X^5$ and $X^6$ is S.

6. The dispersant adduct according to claim 3 wherein $X^3$ and $X^4$ are each O and each of $X^1$, $X^2$, $X^5$ and $X^6$ is O.

7. The dispersant adduct according to claim 3 wherein $X^3$ and $X^4$ are each O and each of $X^1$, $X^2$, $X^5$ and $X^6$ is S.

8. The dispersant adduct according to any of claims 4 through 8 wherein $Z^1$ is alkylene of from 1 to 4 carbon atoms.

9. The dispersant adduct according to claim 8 wherein the long chain hydrocarbyl substituent comprises polyisobutylene.

10. The dispersant adduct according to claim 8 wherein said polyisobutylene is characterized by a number average molecular weight of from about 900 to 4,000.

11. The dispersant adduct according to claim 1 wherein the long chain hydrocarbyl substituent comprises polyisobutylene.

12. The dispersant adduct according to claim 11 wherein said polyisobutylene is characterized by a number average molecular weight of from about 1,300 to 3,000.

13. The dispersant adduct according to claim 1 wherein the bis-(beta-keto/thioketo ester/thioester) compound comprises at least one alicyclic compound of the formula:

$$R^1-X^1-\overset{\overset{X^2}{\|}}{C}-\overset{\overset{R^2}{|}}{\underset{\underset{R^3}{|}}{C}}-\overset{\overset{O}{\|}}{C}-Z^1-\overset{\overset{O}{\|}}{C}-\overset{\overset{R^4}{|}}{\underset{\underset{R^5}{|}}{C}}-\overset{\overset{X^5}{\|}}{C}-X^6-R^6$$

or alicyclic compound of the formula:

(structure with central ring containing C=O, C, C, C, Z¹, and substituents R³, R⁴, R⁵, X⁵, X¹, X², R², and X⁶—R⁶)

wherein $R^1$ through $R^6$, $Z^1$, $X^1$, $X^2$, $X^5$ and $X^6$ are as defined above.

14. The dispersant adduct according to claim 1 wherein the bis-(beta-keto/thioketo ester/thioester) compound comprises at least one alicyclic compound of the formula:

$$R^1-X^1-\overset{\overset{X^2}{\|}}{C}-\overset{\overset{R^2}{|}}{\underset{\underset{R^3}{|}}{C}}-\overset{\overset{S}{\|}}{C}-Z^1-\overset{\overset{S}{\|}}{C}-\overset{\overset{R^4}{|}}{\underset{\underset{R^5}{|}}{C}}-\overset{\overset{X^5}{\|}}{C}-X^6-R^6$$

or alicyclic bis-beta-thioketo compound of the formula:

(structure with central ring, C=S groups, substituents R³, R⁴, R⁵, X⁵, X¹, X², R², and X⁶—R⁶)

wherein $R^1$ through $R^6$, $Z^1$, $X^1$, $X^2$, $X^5$ and $X^6$ are as defined above.

15. The dispersant adduct according to any of claims 13 to 14 wherein said ashless dispersant comprises the nitrogen-containing reaction product of (a) at least one polymer substituted succinic anhydride wherein said polymer has a number average molecular weight of from about 1,300 to 3,000 and wherein said polymer comprises polyisobutylene containing up to about 40% of monomer units derived from butene-1 and/or butene-2; and (b) at least one polyamine.

16. The dispersant adduct according to claim 15 wherein said polymer substituted succinic anhydride contains from about 1.0 to 1.8 dicarboxylic acid producing moieties per molecule of said olefin polymer present in the reaction mixture used to form said polymer substituted succinic anhydride.

17. The dispersant adduct according to claim 2 wherein said polyamine comprises an amido-amine and wherein said ashless dispersant contains at least two reactive amino groups selected from primary and secondary amino groups per molecule.

18. The dispersant adduct according to claim 17 wherein said olefin polymer comprises polyisobutylene containing up to 40% of monomer units derived from butene-1 and/or butene-2.

19. The dispersant adduct according to claim 16 wherein said polyamine contains from 2 to 60 carbon atoms and from 1 to 12 nitrogen atoms per molecule.

20. The dispersant adduct according to claim 19 wherein said polyamine contains from 2 to 40 carbon atoms and from 3 to 9 nitrogen atoms per molecule and wherein said ashless dispersant contains at least two reactive amino groups selected from primary and secondary amino groups per molecule.

21. The dispersant adduct according to any of claims 1, 3-8, 10-15 and 17-21 wherein said borated dispersant adduct contains about 0.05 to 2.0 weight percent boron.

22. The dispersant adduct according to claim 8 wherein said borated dispersant adduct contains about 0.05 to 2.0 weight percent boron.

23. The dispersant adduct according to claim 15 wherein said borated dispersant adduct contains about 0.05 to 2.0 weight percent boron.

24. A concentrate containing from about 3 to 45 wt. % of the dispersant adduct of claim 1.

25. A concentrate containing from about 10 to 35 wt. % of the dispersant adduct of claim 15.

26. A lubricating oil composition containing from about 0.1 t 20 wt. % of the dispersant adduct of claim 20.

27. A lubricating oil composition containing from about 0.1 to 20 wt. % of the dispersant adduct of claim 21.

28. A borated adduct useful as a dispersant additive to oleaginous compositions, said dispersant adduct having been prepared by:

(1) preparing a coupled adduct formed by reaction of at least one polyamine and at least one bis-(keto-/thioketo ester/thioester) compound linking reactant; and (2) reacting said coupled adduct with at least one long chain hydrocarbyl polymer substituted mono- and dicarboxylic acids or their anhydrides or esters; and (3) borating said reacted adduct.

29. The dispersant adduct according to claim 28 wherein said long chain hydrocarbyl polymer substituted reactant comprises a long chain hydrocarbyl polymer substituted with at least one of $C_4$ to $C_{10}$ monounsaturated dicarboxylic acid producing moieties and $C_3$ to $C_{10}$ monounsaturated monocarboxylic acid producing moieties, said substituted polymer formed by reacting an olefin polymer of $C_2$ to $C_{10}$ monoolefin having a number average molecular weight of about 50 to 6,000 and a monounsaturated carboxylic reactant comprising at least one member selected from the group consisting of (i) monounsaturated $C_4$ to $C_{10}$ dicarboxylic acids; (ii) anhydride and $C_1$ to $C_5$ alcohol derived mono- or diester derivatives of (i); (iii) monounsaturated $C_3$ to $C_{10}$ monocarboxylic acids wherein the carbon-carbon double bond is conjugated to the carboxy group; and (iv) $C_1$ to $C_5$ alcohol derived monoester derivatives of (iii).

30. The dispersant adduct according to claim 28 wherein the bis-(keto/thioketo ester/thioester) compound comprises at least one bis-(beta-keto/thioketo ester/thioester) compound of the formula

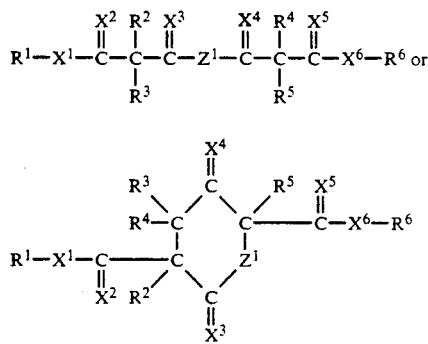

wherein $R^1$, $R^2$, $R^3$, $R^4$, $R^5$ and $R^6$ are independently selected from the group consisting of H and substituted or unsubstituted hydrocarbyl, $Z^1$ is divalent hydrocarbyl, which can be substituted or unsubstituted, and $X^1$, $X^2$, $X^3$, $X^4$, $X^5$, and $X^6$ are the same or different and are O or S.

31. The dispersant adduct according to claim 30 wherein $X^3$ and $X^4$ are each O and at least one of $X^1$, $X^2$, $X^5$ and $X^6$ is O.

32. The dispersant adduct according to claim 30 wherein $X^3$ and $X^4$ are each O and at least one of $X^1$, $X^2$, $X^5$ and $X^6$ is S.

33. The dispersant adduct according to claim 30 wherein $X^3$ and $X^4$ are each O and each of $X^1$, $X^2$, $X^5$ and $X^6$ is O.

34. The dispersant adduct according to claim 30 wherein $X^3$ and $X^4$ are each O and each of $X^1$, $X^2$, $X^5$ and $X^6$ is S.

35. The dispersant adduct according to any one of claims 30 through 34 wherein $Z^1$ is alkylene of from 1 to 4 carbon atoms.

36. The dispersant adduct according to claim 30 wherein said long chain hydrocarbyl polymer comprises polyisobutylene.

37. The dispersant adduct according to claim 36 wherein said polyisobutylene is characterized by a number average molecular weight of from about 900 to 4,000.

38. The dispersant adduct according to claim 37 wherein said long chain hydrocarbyl polymer substituted reactant comprises polyisobutylene-substituted succinic anhydride containing from about 1.0 to 1.8 succinic anhydride moieties per molecule of said polyisobutylene present in the reaction mixture used to form said polyisobutylene-substituted succinic anhydride.

39. The dispersant adduct according to claim 30 wherein said polyamine comprises an amino-amine and wherein said ashless dispersant contains at least two reactive amino groups selected from primary and secondary amino groups per molecule.

40. The dispersant adduct according to claim 39 wherein said long chain hydrocarbyl polymer comprises polyisobutylene containing up to 40% of monomer units derived from butene-1 and/or butene-2.

41. The dispersant adduct according to claim 40 wherein said polyamine contains from 2 to 60 carbon atoms and from 1 to 12 nitrogen atoms per molecule.

42. The dispersant adduct according to claim 41 wherein said polyamine contains from 2 to 40 carbon atoms and from 3 to 9 nitrogen atoms per molecule and wherein said coupled adduct contains at least two reactive amino groups selected from primary and secondary amino groups per molecule.

43. The dispersant adduct according to claim any of claims 28-34 wherein said borated dispersant adduct contains about 0.05 to 2.0 weight percent boron.

44. The dispersant adduct according to claim 35 wherein said borated dispersant adduct contains about 0.05 to 2.0 weight percent boron.

* * * * *